US009128546B2

(12) United States Patent
Yoshida et al.

(10) Patent No.: US 9,128,546 B2
(45) Date of Patent: Sep. 8, 2015

(54) TOUCH PANEL CONTROLLER, TOUCH PANEL SYSTEM AND METHOD OF OPERATING TOUCH PANEL SYSTEM

(75) Inventors: Shinichi Yoshida, Osaka (JP); Akira Nishioka, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 351 days.

(21) Appl. No.: 13/452,143

(22) Filed: Apr. 20, 2012

(65) Prior Publication Data

US 2013/0063375 A1    Mar. 14, 2013

Related U.S. Application Data

(63) Continuation of application No. PCT/JP2012/052249, filed on Feb. 1, 2012.

(30) Foreign Application Priority Data

Sep. 14, 2011  (JP) ................................. 2011-200902
Nov. 10, 2011  (JP) ................................. 2011-246795

(51) Int. Cl.
G06F 3/041 (2006.01)
G06F 3/044 (2006.01)

(52) U.S. Cl.
CPC ................ G06F 3/041 (2013.01); G06F 3/044 (2013.01); G06F 3/0416 (2013.01)

(58) Field of Classification Search
CPC ............................... G06F 3/0416; G06F 3/044
See application file for complete search history.

(56) References Cited

U.S. PATENT DOCUMENTS

| 2009/0233650 | A1  |  9/2009 | Hosono |
| 2010/0283752 | A1* | 11/2010 | Maeda ........................... 345/173 |
| 2010/0309171 | A1* | 12/2010 | Hsieh et al. .................... 345/204 |
| 2011/0148785 | A1  |  6/2011 | Oda et al. |
| 2011/0148806 | A1  |  6/2011 | Oda et al. |
| 2011/0153263 | A1* |  6/2011 | Oda et al. ....................... 702/150 |
| 2011/0181525 | A1* |  7/2011 | Hsieh et al. .................... 345/173 |

FOREIGN PATENT DOCUMENTS

| JP | 2009-217612 A |  9/2009 |
| JP | 2010-262460 A | 11/2010 |
| JP | 2011-128982 A |  6/2011 |
| JP | 2011-170511 A |  9/2011 |

* cited by examiner

Primary Examiner — Ryan A Lubit
Assistant Examiner — Lisa Landis
(74) Attorney, Agent, or Firm — Birch, Stewart, Kolasch & Birch, LLP

(57) ABSTRACT

A touch panel system in which power consumption is reduced and detection sensitivity is enhanced, a controller for the touch panel system, and a method of operating the system. Touch panel system includes status detecting portion having status signal generating portions generating a status signal indicative of a close status of an indicator, a position calculating portion processing the status signal, thereby calculating a position of the indicator on a detecting surface, and a region setting portion for updating an effective region set in the detecting surface P based on the position of the indicator which is calculated by the position calculating portion. A first operation causes the status signal generating portions SL and DL to selectively generate a status signal and a second operation causes the position calculating portion to selectively process the status signals generated by the status signal generating portions SL and DL.

16 Claims, 20 Drawing Sheets

TOUCH PANEL CONTROLLER, TOUCH PANEL SYSTEM AND METHOD OF OPERATING TOUCH PANEL SYSTEM

CROSS-REFERENCE TO RELATED APPLICATIONS

This application is a Continuing Application filing under 35 U.S.C. §371 of International Application No. PCT/JP2012/052249 filed on Feb. 1, 2012, and which claims priority to Japanese Patent Applications No. 2011-200902 filed on Sep. 14, 2011 and No. 2011-246795 filed on Nov. 10, 2011.

TECHNICAL FIELD

The present invention relates to a touch panel system provided on a surface of a display device or the like, a touch panel controller for controlling the touch panel system, and a method of operating the touch panel system.

BACKGROUND ART

In recent years, a touch panel system for detecting a position of an indicator on a detecting surface (for example, a finger of a user, a styrus or the like, the same shall apply hereinafter) to accept an instruction of the user is often provided on a display surface of a display device such as a portable telephone or a personal computer. Moreover, there is recently made a trial for increasing a size of the detecting surface of the touch panel system in order to provide the touch panel system on a display surface of a larger-sized display device, a white board or the like.

In the case in which the size of the detecting surface of the touch panel system is increased, it is necessary to provide a large number of elements for detecting an indicator or the like in order to detect the indicator without omission. In the case in which these elements are operated at the same time, there might be caused a problem in that a power consumption is increased, and furthermore, a detection sensitivity is deteriorated due to an occurrence of a noise or the like.

In Patent Document 1, for example, there is therefore proposed a capacitive touch panel system having an electrode arranged in vertical and horizontal directions of a detecting surface respectively in which the electrodes are detected one by one in order, and furthermore, a detection period for any of the electrodes that is closer to a position where an indicator is detected is made longer than the other electrodes.

In the touch panel system proposed in the Patent Document 1, however, it is necessary to detect the electrodes one by one in order. For this reason, a long time is required for detecting the indicator, so that a deterioration in the detection sensitivity might be caused, which is a problem.

In Patent Document 2, for example, there is proposed a capacitive touch panel system having a plurality of transmitting conductors arranged in a horizontal direction of a detecting surface and a plurality of receiving conductors arranged in a vertical direction of the detecting surface, in which a signal is applied to every predetermined number of transmitting conductors (at each predetermined interval) selectively and simultaneously and a signal generated in every predetermined number of receiving conductors (at each predetermined interval) is selectively acquired. In the touch panel system, the transmitting conductor for applying a signal and the receiving conductor for acquiring a signal are switched every predetermined time while the predetermined number of intervals are maintained respectively, thereby applying a signal to all of the transmitting conductors and acquiring a signal from all of the receiving conductors.

PRIOR ART DOCUMENT

Patent Document

Patent Document 1 Japanese Laid-Open Patent Publication No. 2010-262460
Patent Document 2 Japanese Laid-Open Patent Publication No. 2011-128982

DISCLOSURE OF THE INVENTION

Problems to be Solved by the Invention

Also in the touch panel system proposed in the Patent Document 2, however, it is necessary to switch the transmitting conductors for applying a signal and the receiving conductors for acquiring a signal every predetermined time respectively, thereby selecting all of them. For this reason, a long time is taken for detecting an indicator, resulting in a deterioration in a detection sensitivity. Therefore, there is caused a problem.

Therefore, it is an object of the present invention to provide a touch panel system in which a power consumption is reduced and a detection sensitivity is enhanced, a touch panel controller for controlling the touch panel system, and a method of operating the touch panel system.

Means for Solving the Problem

In order to achieve the object, the present invention provides a touch panel controller including a driving portion for driving a plurality of status signal generating portions each of which generates a status signal indicative of a close status of an indicator to an assigned detecting region;
a position calculating portion for processing the status signal, thereby calculating a position of the indicator on a detecting surface constituted by a combination of detecting regions; and
a region setting portion for updating an effective region set in the detecting surface to set a new effective region based on the position of the indicator calculated by the position calculating portion,
wherein there is carried out at least one of:
a first operation for causing the driving portion to selectively drive the status signal generating portion in which at least a part of the assigned detecting region is included in the effective region set currently, thereby generating the status signal selectively; and
a second operation for causing the position calculating portion to selectively process the status signal generated by the status signal generating portion in which at least a part of the assigned detecting region is included in the effective region set currently.

The close status of the indicator indicated by the status signal can include a degree of the closeness of the indicator to the detecting surface (a distance between the detecting surface and the indicator in a status in which the indicator does not come in contact with the detecting surface, a pressure to be applied to the detecting surface by the indicator in the status in which the indicator comes in contact with the detecting surface or the like) in addition to the presence of the contact of the indicator with the detecting surface.

In the touch panel controller having the feature described above, furthermore, it is preferable that the status signal generating portions should be constituted by:

a plurality of parallel drive lines provided along the detecting surface; and a plurality of parallel sense lines provided along the detecting surface, the sense lines solid crossing the drive lines, each of the sense lines generating the status signal; and the driving portion should drive the drive line, thereby generating the status signal on the sense line solid crossing the driven drive line.

In this case, the status signal indicative of the status in the solid crossing part of the driven drive line and the sense line or the vicinal part thereof (the detecting region) is generated in the sense line. In the case in which the drive lines are driven, moreover, the status signal indicative of the close status of the indicator to each of the detecting regions constituted by the drive lines and the sense line is generated on the sense line.

In the touch panel controller having the feature described above, moreover, it is preferable that the driving portion should selectively drive the drive line passing through the effective region.

In this case, it is possible to prevent the drive line from being uselessly driven. Therefore, it is possible to reduce the power consumption taken for the driving operation of the drive line, and furthermore, to suppress an occurrence of a noise, resulting in an enhancement in a detection sensitivity. By driving the drive line restrictively, moreover, it is possible to enhance precision in the calculation of the position of the indicator in the position calculating portion.

In the touch panel controller having the feature described above, furthermore, it is preferable that the driving portion should apply a particular driving signal set every drive line to each of the drive lines passing through the effective region, and should not apply the driving signal to each of the drive lines not passing through the effective region.

In this case, the position calculating portion can easily identify a fluctuation in the status signal generated by the presence of the indicator on the detecting surface.

In the touch panel controller having the feature described above, moreover, it is preferable that the position calculating portion should selectively process the status signal generated on the sense line passing through the effective region.

In this case, it is possible to prevent the useless processing for the status signal. Therefore, it is possible to reduce the power consumption taken for the processing for the status signal. By restrictively processing the status signal generated on the sense line passing through the effective region, moreover, it is possible to enhance the precision in the calculation of the position of the indicator.

In the touch panel controller having the feature described above, furthermore, it is preferable that the position calculating portion should include an amplifying portion for selectively amplifying the status signal generated on the sense line passing through the effective region.

In this case, it is possible to prevent the useless amplification of the status signal. Therefore, it is possible to reduce the power consumption taken for the amplification of the status signal.

In the touch panel controller having the feature described above, moreover, it is preferable that the position calculating portion should include a signal acquiring portion for selectively acquiring the status signal generated on the sense line passing through the effective region and outputting the status signal in a time division.

In this case, it is possible to prevent a useless status signal from being output to a subsequent stage of the signal acquiring portion. Therefore, it is possible to reduce a power consumption taken for a processing in the subsequent stage of the signal acquiring portion.

In the touch panel controller having the feature described above, furthermore, it is preferable that the region setting portion should set a new effective region including the position of the indicator calculated by the position calculating portion.

In this case, the region setting portion can set a new effective region having a high possibility of an inclusion of a position in which the indicator is subsequently detected.

In the touch panel controller having the feature described above, moreover, it is preferable that the region setting portion should set a new effective region having a size corresponding to a moving speed of the indicator.

In this case, the region setting portion can set a new effective region having a high possibility of an inclusion of a position in which the indicator is subsequently detected.

In the touch panel controller having the feature described above, furthermore, it is preferable that the region setting portion should set a new effective region which is the whole detecting surface when the position calculating portion does not calculate the position of the indicator.

In this case, irrespective of any position on the detecting surface where the indicator subsequently appears, the status detecting portion and the position calculating portion can detect the indicator, thereby calculating the position.

In the touch panel controller having the feature described above, moreover, it is preferable that the region setting portion should set a new effective region based on the position of the indicator calculated by the position calculating portion when a first mode is selected, and the region setting portion should continuously set a new effective region which is the whole detecting surface when a second mode is selected.

In this case, for example, it is possible to operate the touch panel system in either the first mode for enhancing power saving and a detection sensitivity or the second mode for detecting the indicator without omission from the whole detecting surface depending on an installation environment, a usage environment or the like for the touch panel system.

In the touch panel controller having the feature described above, furthermore, it is preferable that the region setting portion should set a new effective region based on the positions of the indicators calculated by the position calculating portion when the position calculating portion calculates the positions of the indicators.

In this case, also when the position calculating portion calculates the positions of the indicators (in a multi-touch), the region setting portion can set the effective region.

In the touch panel controller having the feature described above, moreover, it is preferable that the region setting portion should set a plurality of new effective regions corresponding to the positions of the respective indicators when setting the new effective regions based on the positions of the indicators calculated by the position calculating portion.

In this case, it is possible to provide a clearance (a region which is not the effective region) between the respective effective regions set by the region setting portion. Therefore, it is possible to decrease a total area of the effective regions set by the region setting portion.

In the touch panel controller having the feature described above, furthermore, it is preferable that an upper limit should be set to the number of the new effective regions set by the region setting portion.

In this case, the number of the effective regions that the region setting portion can set is restricted to be equal to or smaller than the upper limit. Therefore, it is possible to prevent an amount of a calculation of the region setting portion from being excessively large or to suppress an excessive increase in the total area of the effective regions set by the region setting portion.

In the touch panel controller having the feature described above, moreover, it is preferable that the region setting portion should set the new effective region which is the whole detecting surface at every predetermined timing.

In this case, even if the indicator appears newly on the detecting surface after the region setting portion starts the operation (spot driving) for sequentially setting the effective region depending on the position of the indicator calculated sequentially by the position calculating portion, the effective region which is the whole detecting surface is set in a predetermined timing. Therefore, the position calculating portion can calculate the position of the indicator.

In addition, the present invention provides a touch panel system including:

the touch panel controller having the feature described above; and the plurality of status signal generating portions.

In the touch panel system having the feature described above, furthermore, it is preferable that the status signal generating portions should be constituted by:

a plurality of parallel drive lines provided along the detecting surface; and a plurality of parallel sense lines provided along the detecting surface, solid crossing the drive lines and generating the status signal; and should include a mounting surface obtained by wiring the drive lines and the sense lines to a panel body.

Moreover, the present invention provides a method of operating a touch panel system including;

a status detecting step of generating a status signal indicative of a close status of an indicator to a detecting region;

a position calculating step of processing the status signal, thereby calculating a position of the indicator on a detecting surface constituted by a combination of the detecting regions; and an effective region setting step of updating an effective region set in the detecting surface to set a new effective region based on the position of the indicator calculated at the position calculating step, wherein there is carried out at least one of;

a first operation for selectively generating the status signal indicative of the close status of the indicator to the detecting region having at least a part included in the effective region set currently at the status detecting step; and a second operation for selectively processing the status signal indicative of the close status of the indicator to the detecting region having at least a part included in the effective region set currently at the position calculating step.

Effect of the Invention

According to the touch panel controller, the touch panel system and the method of operating the touch panel system which have the feature described above, the effective region to be the region in which the indicator is to be detected is set restrictively in the detecting surface based on the position of the indicator which is calculated. Therefore, it is possible to reduce a power consumption and to enhance a detection sensitivity of the indicator by avoiding a useless detection.

MODE FOR CARRYING OUT THE INVENTION

Description will be given by illustrating, as an embodiment according to the present invention, a projected capacitive touch panel system in which a drive line and a sense line are provided along a detecting surface.

<<Example of Structure of Touch Panel System>>

Figure 1:
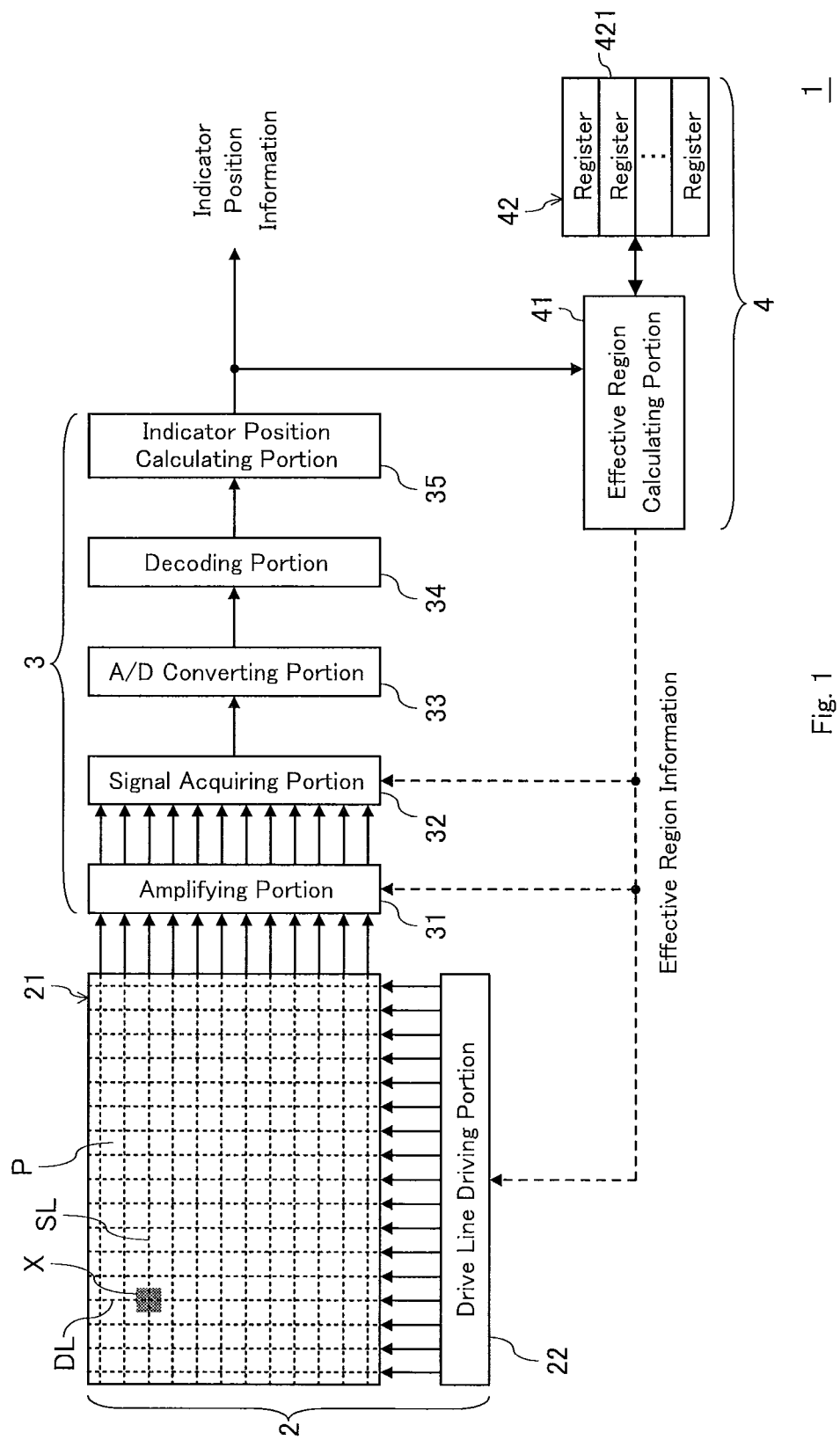
FIG. 1 is a block diagram showing an example of a structure of a touch panel system according to an embodiment of the present invention.

First of all, an example of a structure of the touch panel system according to the embodiment of the present invention will be described with reference to the drawings. FIG. 1 is a block diagram showing an example of a structure of a touch panel system according to the embodiment of the present invention.

As shown in FIG. 1, a touch panel system 1 includes a status detecting portion 2 for generating a status signal indicative of a close status of an indicator to a detecting surface P, a position calculating portion 3 for processing the status signal generated by the status detecting portion 2, thereby calculating a position of the indicator on the detecting surface P to generate indicator position information, and a region setting portion 4 for setting an effective region in the detecting surface P to generate effective region information based on the indicator position information generated by the position calculating portion 3. The close status of the indicator which is indicated by the status signal can include a degree at which the indicator is close to the detecting surface P (a distance between the detecting surface P and the indicator in a status in which the indicator does not come in contact with the detecting surface P, a pressure to be applied to the detecting surface P by the indicator in the case in which the indicator comes in contact with the detecting surface P, and the like) as well as presence of the contact of the indicator with the detecting surface P.

<Status Detecting Portion>

The status detecting portion 2 includes a mounting surface 21 obtained by wiring a plurality of parallel drive lines DL provided along the detecting surface P and a plurality of parallel sense lines SL provided along the detecting surface P to a panel body constituted by a transparent resin material, for example, and a drive line driving portion (driving portion) 22 for driving the drive line DL.

The drive line DL and the sense line SL carry out solid crossing and a status signal indicative of a close status of an indicator to the solid crossing portion of the drive line DL to be driven and the sense line SL or a vicinal portion (which will be hereinafter referred to as a detecting region X) is generated in the sense line SL. The status signal has a value corresponding to an electrostatic capacitance between the drive line DL and the sense line SL. However, an electrostatic capacitance in the case in which the indicator is present on the detecting region X is smaller than that in the case in which the indicator is not present. Accordingly, the status signal fluctuates depending on whether the indicator is present on the detecting region X or not.

In the case in which the drive lines DL are driven, moreover, the status signal indicative of the status of each of the detecting regions X formed by the respective drive lines DL and the sense line SL is generated on the sense line SL. Although FIG. 1 illustrates the case in which the drive line DL and the sense line SL carry out the solid crossing perpendicularly, they may carry out the solid crossing at an angle other than a perpendicularity.

The drive line driving portion 22 acquires effective region information and grasps an effective region set by the region setting portion 4. Then, the drive line driving portion 22 drives each of the drive lines DL based on the effective region set by the region setting portion 4. A specific example of a method of driving the drive line DL through the drive line driving portion 22 will be described below.

<Position Calculating Portion>

The position calculating portion 3 includes an amplifying portion 31 for amplifying a status signal generated on the sense line SL, a signal acquiring portion 32 for acquiring the status signal amplified by the amplifying portion 31 and outputting the acquired status signal in a time division, an A/D converting portion 33 for converting an analog signal output from the signal acquiring portion 32 into a digital signal, a decoding portion 34 for obtaining a variation in a capacitance distribution in the detecting surface P acquired through a combination of the detecting regions X based on the digital signal obtained by the conversion in the A/D converting portion 33, and an indicator position calculating portion 35 for calculating a position of the indicator on the detecting surface P to generate indicator position information indicative of the position based on the variation in the capacitance distribution obtained by the decoding portion 34.

Each of the amplifying portion 31 and the signal acquiring portion 32 acquires effective region information to grasp an effective region set by the region setting portion 4. Then, the amplifying portion 31 amplifies the status signal generated on the sense line SL based on the effective region set by the region setting portion 4. Moreover, the signal acquiring portion 32 selects the status signal generated on the sense line SL and amplified by the amplifying portion 31 and outputs the status signal in a time division based on the effective region set by the region setting portion 4. A specific example of the methods of amplifying and acquiring the status signal through the amplifying portion 31 and the signal acquiring portion 32 will be described below.

The A/D converting portion 33 converts an analog signal output from the signal acquiring portion 32 into a digital signal having a predetermined number of bits. Although the number of the bits of the digital signal to be generated by the A/D converting portion 33 is optional, it is preferable that the number of the bits should be equal to or larger than 12 and be equal to or smaller than 16, for example, in consideration of precision in the processings in the decoding portion 34 and the indicator position calculating portion 35 in a subsequent stage (precision in the detection of the indicator).

The decoding portion 34 obtains a variation in a capacitance distribution in the detecting surface P based on the digital signal obtained by the conversion in the A/D converting portion 33. For example, the decoding portion 34 acquires a digital signal in the case in which the indicator is not present on the detecting surface P, thereby obtaining a capacitance distribution in the case in which the indicator is not present on the detecting surface P in advance before the detection of the indicator. Therefore, the decoding portion 34 acquires the digital signal in the detection of the indicator to obtain the capacitance distribution, and compares the capacitance distribution with the capacitance distribution in the case of the absence of the indicator which is previously obtained, thereby acquiring a variation in the capacitance distribution (a variation in an electrostatic capacitance which is caused by the indicator). The decoding portion 34 may grasp the status of the drive line DL to be controlled by the drive line driving portion 22 by acquiring the effective region information.

The indicator position calculating portion 35 calculates the position of the indicator on the detecting surface P based on the variation in the capacitance distribution obtained by the decoding portion 34, thereby generating indicator position information. For example, the indicator position calculating portion 35 decides that the indicator is present in a portion in which the variation in the electrostatic capacitance is comparatively increased in the detecting surface P, thereby calculating the position of the indicator on the detecting surface P.

In the case in which the indicator position calculating portion 35 cannot calculate the position of the indicator, it is also possible to generate indicator position information indicative of the purport that the calculation cannot be carried out.

<Region Setting Portion>

The region setting portion 4 includes an effective region calculating portion 41 for setting an effective region in the detecting surface P to generate effective region position information based on indicator position information, and a storing portion 42 for storing a necessary parameter for the calculation in the effective region calculating portion 41 or the like.

The effective region calculating portion 41 is constituted by a CPU (Central Processing Unit), for example, and acquires indicator position information to grasp the position of the indicator on the detecting surface P which is calculated by the position calculating portion 3. The effective region calculating portion 41 sets an effective region in the detecting surface P to generate effective region information based on the position of the indicator on the detecting surface P which is calculated by the position calculating portion 3. The storing portion 42 includes a register 421 for storing a necessary parameter for the calculation of the effective region calculating portion 41 or the like. A specific example of the calculation content in the effective region calculating portion 41 (a method of setting an effective region) will be described below.

<<First Operation Example of Touch Panel System>>

Figure 2:
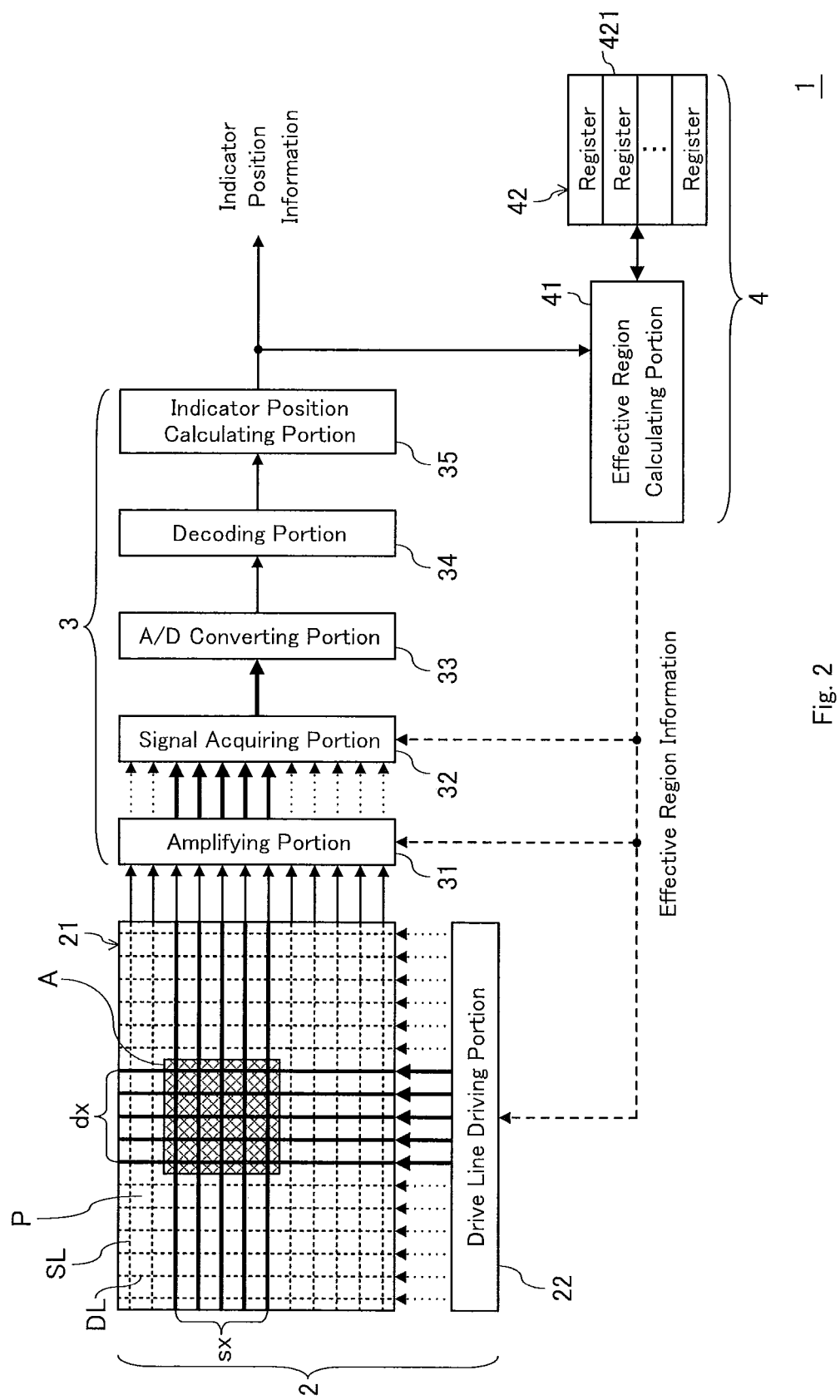
FIG. 2 is a block diagram showing an example of an effective region to be set in a detecting surface according to a first operation example.

Next, a first operation example of the touch panel system 1 shown in FIG. 1 will be described with reference to the drawings. First of all, an example of the effective region to be set in the detecting surface P by the region setting portion 4 will be described with reference to the drawings. FIG. 2 is a block diagram showing an example of the effective region to be set in the detecting surface according to the first operation example.

An effective region A illustrated in FIG. 2 is set in a partial region of the detecting surface P. Moreover, each of a drive line dx and a sense line sx (thick solid lines in the drawing) passes through the effective region A. In other words, each of the detecting regions X constituted by the drive line dx and the sense line sx has at least a part included in the effective region A.

<Status Detecting Portion>

For concreteness of the description, there is assumed the case in which the effective region A shown in FIG. 2 is set in the detecting surface P. In this case, the drive line driving portion 22 applies a driving signal having a signal level changed temporarily to each of the drive lines dx passing through the effective region A. On the other hand, the drive line driving portion 22 does not apply the driving signal to each of the drive lines which do not pass through the effective region A.

Figure 3A:
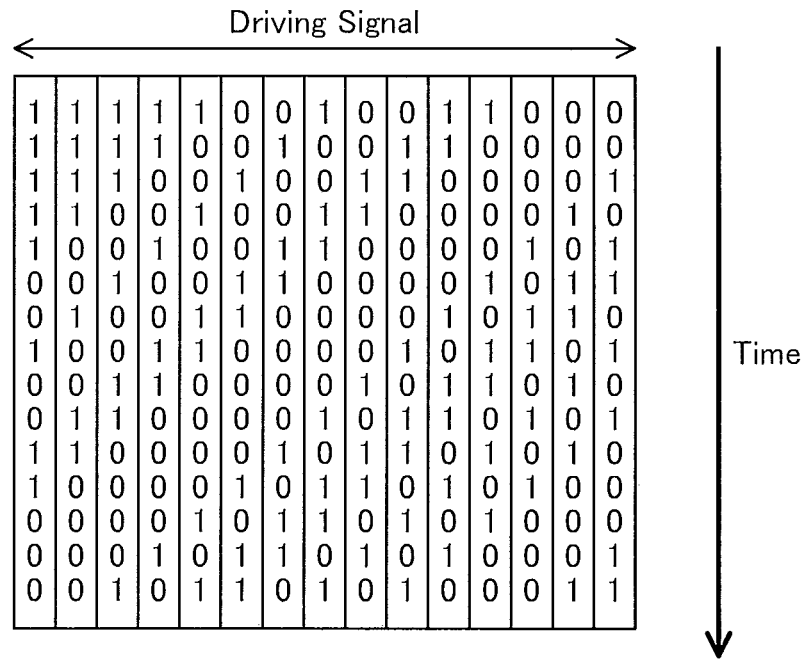
FIG. 3 is a diagram showing an example of a specific method of driving a drive line through a drive line driving portion according to the first operation example.

A specific example of a method of driving the drive line DL through the drive line driving portion 22 will be described with reference to the drawings. FIG. 3 is a diagram showing an example of a specific method of driving a drive line through a drive line driving portion according to a first operation example. FIG. 3A shows the case in which the whole detecting surface P is set as an effective region, and FIG. 3B shows the case in which the effective region is set in a part of the detecting surface (the case in which the effective region A shown in FIG. 2 is set).

In the case in which the whole detecting surface P is set as the effective region as shown in FIG. 3A, the drive line driving portion 22 applies a driving signal to all of the drive lines DL. At this time, the drive line driving portion 22 applies a particular driving signal which is set every drive line DL. The driving signal is constituted by a combination of a high level ("1") and a low level ("0") and has a signal level changed with respect to a time direction.

Figure 3B:
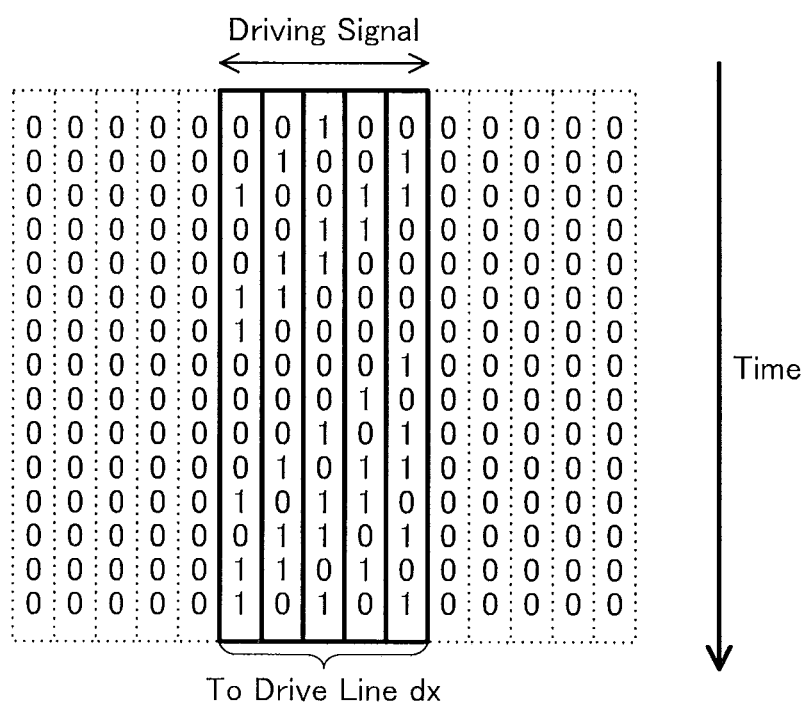

On the other hand, in the case in which the effective region A is set in a part of the detecting surface P as shown in FIG. 3B, the drive line driving portion 22 applies a driving signal to the drive line dx passing through the effective region A. At this time, the drive line driving portion 22 applies the above described particular driving signal to the drive line dx. Moreover, the drive line driving portion 22 grounds each of the drive lines which do not pass through the effective region A and thus prevents the signal level of the drive line from being changed on a time basis.

In the example shown in FIG. 3B, accordingly, the driving signal to be applied to the drive line dx passing through the effective region A is set to be the same as the driving signal to be applied to the drive line dx in the case shown in FIG. 3A. In the example shown in FIG. 3B, furthermore, the signal level of the drive line which does not pass through the effective region A has an invariable value of "0" with respect to the time direction. The signal level of the drive line which does not pass through the effective region A is not restricted to be "0" if it is invariable with respect to the time direction, and may be "1" or a combination of "1" and "0" (for example, one of two drive lines which are adjacent to each other may be "0" and the other may be "1").

When the drive line driving portion 22 selectively drives the drive line dx passing through the effective region A, thus, the drive line DL can be prevented from being uselessly driven. Therefore, a power consumption taken for driving the drive line DL can be reduced, and furthermore, an occurrence of a noise can be suppressed, resulting in an enhancement in a detection sensitivity. By restrictively driving the drive line dx, moreover, it is possible to enhance precision in the calculation of the position of the indicator in the position calculating portion 3.

Furthermore, the drive line driving portion 22 controls the drive line DL as shown in FIG. 3 so that the position calculating portion 3 (particularly, the decoding portion 34) can easily identify a fluctuation in a status signal generated by the presence of the indicator on the detecting surface P.

<Position Calculating Portion>

Figure 4:
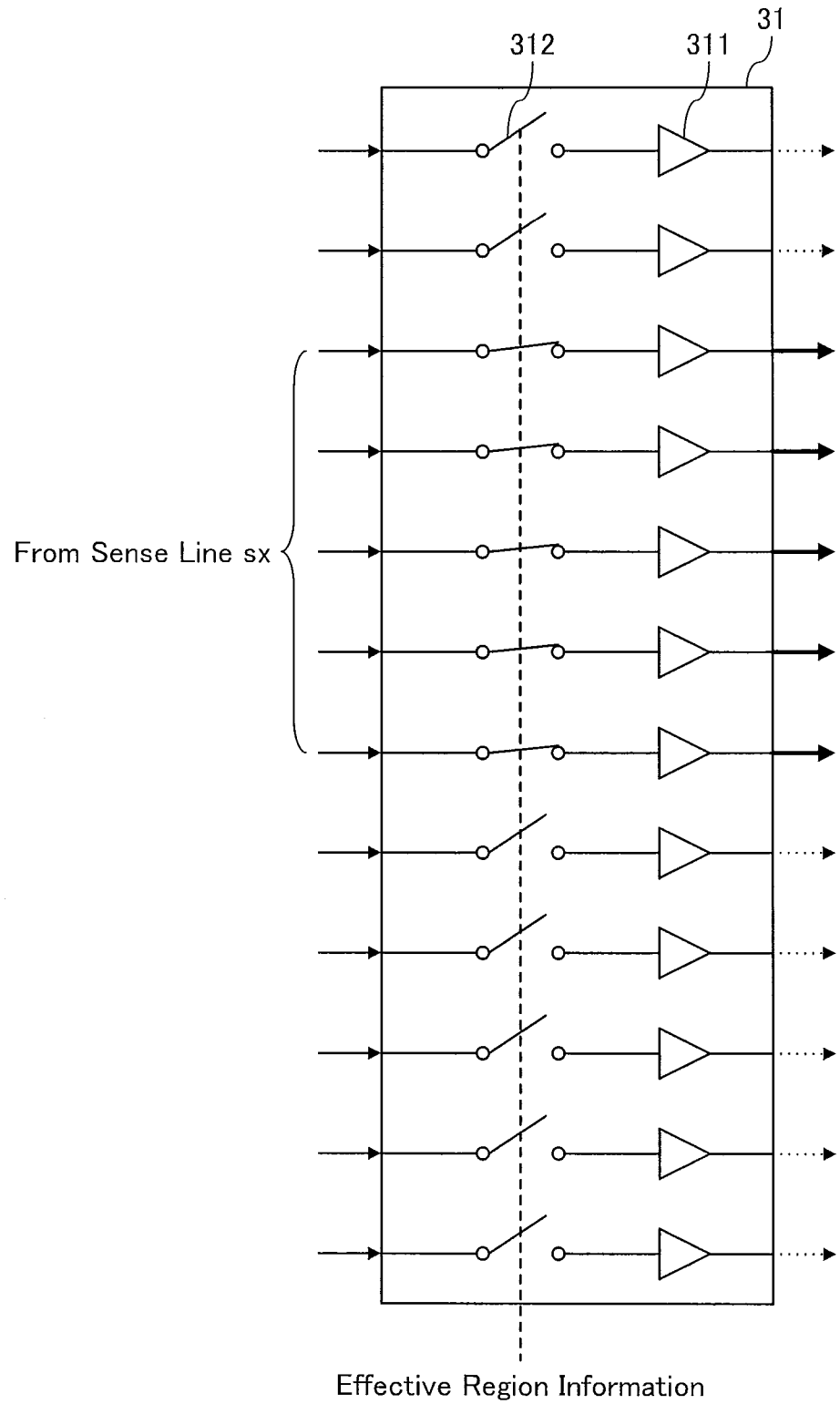
FIG. 4 is a block diagram showing an example of a specific operation of an amplifying portion according to the first operation example.

For concreteness of description, there is assumed the case in which the effective region A shown in FIG. 2 is set in the detecting surface P. In this case, the amplifying portion 31 selectively amplifies a status signal generated on the sense line sx passing through the effective region A. A specific operation example of the amplifying portion 31 will be described with reference to the drawings. FIG. 4 is a block diagram showing an example of the specific operation of the amplifying portion according to a first operation example.

As shown in FIG. 4, the amplifying portion 31 includes an amplifier 311 corresponding to each of the sense lines SL and an opening/closing switch 312 for controlling whether a status signal generated on the sense line SL is to be supplied to the amplifier 311 or not. The respective opening/closing switches 312 are controlled depending on effective region information.

More specifically, the opening/closing switch 312 to which the status signal generated on the sense line sx passing through the effective region A is to be supplied is brought into a conduction status. Consequently, the status signal generated on the sense line sx passing through the effective region A is amplified by the amplifier 311 and is thus output from the amplifying portion 31. On the other hand, the opening/closing switch 312 to which the status signal generated on the sense line not passing through the effective region A is to be supplied is brought into a non-conduction status. Consequently, the status signal generated on the sense line not passing through the effective region A is neither amplified by the amplifier 311 nor output from the amplifying portion 31.

Thus, the amplifying portion 31 selectively amplifies the status signal generated on the sense line sx passing through the effective region A so that a power consumption taken for amplifying the status signal can be reduced. A structure for selectively amplifying the status signal is not limited to the amplifier 311 and the opening/closing switch 312 which are illustrated but other structures may be employed as long as the same effect can be obtained. For example, it is also possible to include a switch capable of changing over an activity/non-activity of the amplifier 311 in place of (or in addition to) the opening/closing switch 312.

Figure 5:
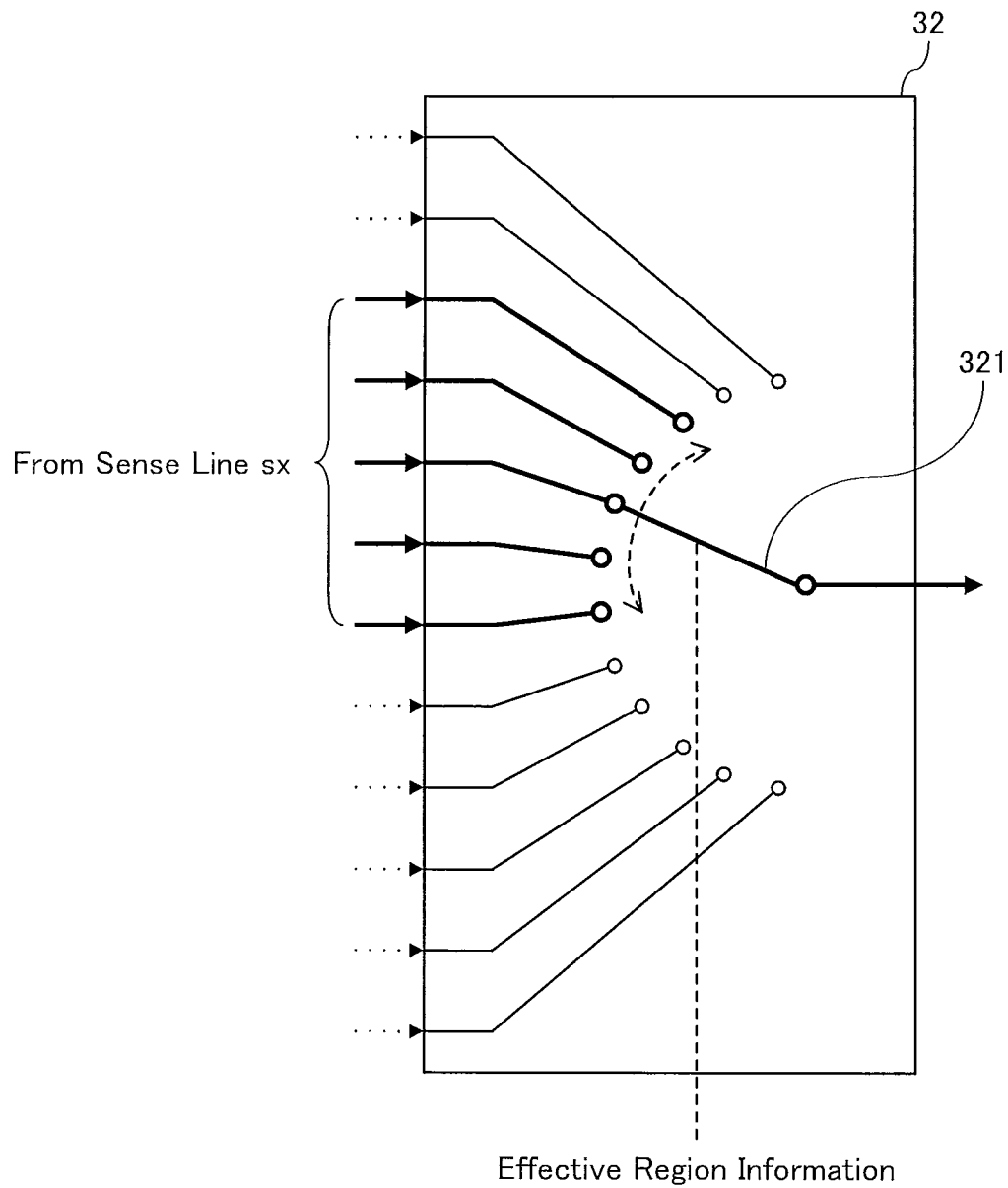
FIG. 5 is a block diagram showing an example of a specific operation of a selective acquiring portion according to the first operation example.

Moreover, the signal acquiring portion 32 selectively acquires the status signal generated on the sense line sx passing through the effective region A and outputs the status signal in a time division. A specific operation example of the signal acquiring portion 32 will be described with reference to the drawings. FIG. 5 is a block diagram showing an example of a specific operation of the selective acquiring portion according to the first operation example.

As shown in FIG. 5, the signal acquiring portion 32 includes a branch switch 321 for selecting one of terminals corresponding to the respective sense lines SL and connecting the terminal to a subsequent stage. The branch switch 321 is controlled depending on the effective region information.

More specifically, the branch switch 321 can be connected to the terminal which corresponds to the sense line sx passing through the effective region A. Consequently, the status signal generated on the sense line sx passing through the effective region A and amplified by the amplifying portion 31 is output to the subsequent stage. On the other hand, the branch switch 321 is not connected to the terminal corresponding to the sense line which does not pass through the effective region A. Consequently, the status signal generated on the sense line which does not pass through the effective region A is not output to the subsequent stage.

Thus, the signal acquiring portion 32 selectively acquires the status signal generated on the sense line sx passing through the effective region A and outputs the status signal in a time division. Consequently, it is possible to prevent a useless status signal from being output to the subsequent stage of the signal acquiring portion 32. Therefore, it is possible to reduce a power consumption taken for a processing in the subsequent stage of the signal acquiring portion 32 (for example, the A/D converting portion 33, the decoding portion 34 and the indicator position calculating portion 35). The structure for selectively acquiring the status signal and outputting the status signal in a time division is not restricted to the branch switch 321 which is illustrated but other structures may be employed as long as the same effects can be obtained.

The A/D converting portion 33 converts an analog signal output by the signal acquiring portion 32 into a digital signal, the decoding portion 34 obtains a variation in a capacitance distribution in the detecting surface P (the effective region A) based on the digital signal, and the indicator position calculating portion 35 refers to the variation in the capacitance distribution, thereby calculating a position of the indicator on the detecting surface P (the effective region A) to generate indicator position information.

Thus, the position calculating portion 3 selectively processes the status signal generated on the sense line sx passing through the effective region A. Therefore, it is possible to prevent a useless processing for the status signal. Accordingly, it is possible to reduce the power consumption taken for the processing of the status signal. By restrictively processing the status signal generated on the sense line sx passing through the effective region A, moreover, it is possible to enhance precision in the calculation of the position of the indicator.

<Region Setting Portion>

As described above, the status detecting portion 2 and the position calculating portion 3 carry out an operation based on the effective region A set by the region setting portion 4. On the other hand, the region setting portion 4 updates the effective region A set in the detecting surface P to set a new effective region based on the position of the indicator on the detecting surface P calculated by the position calculating portion 3.

Figure 6:
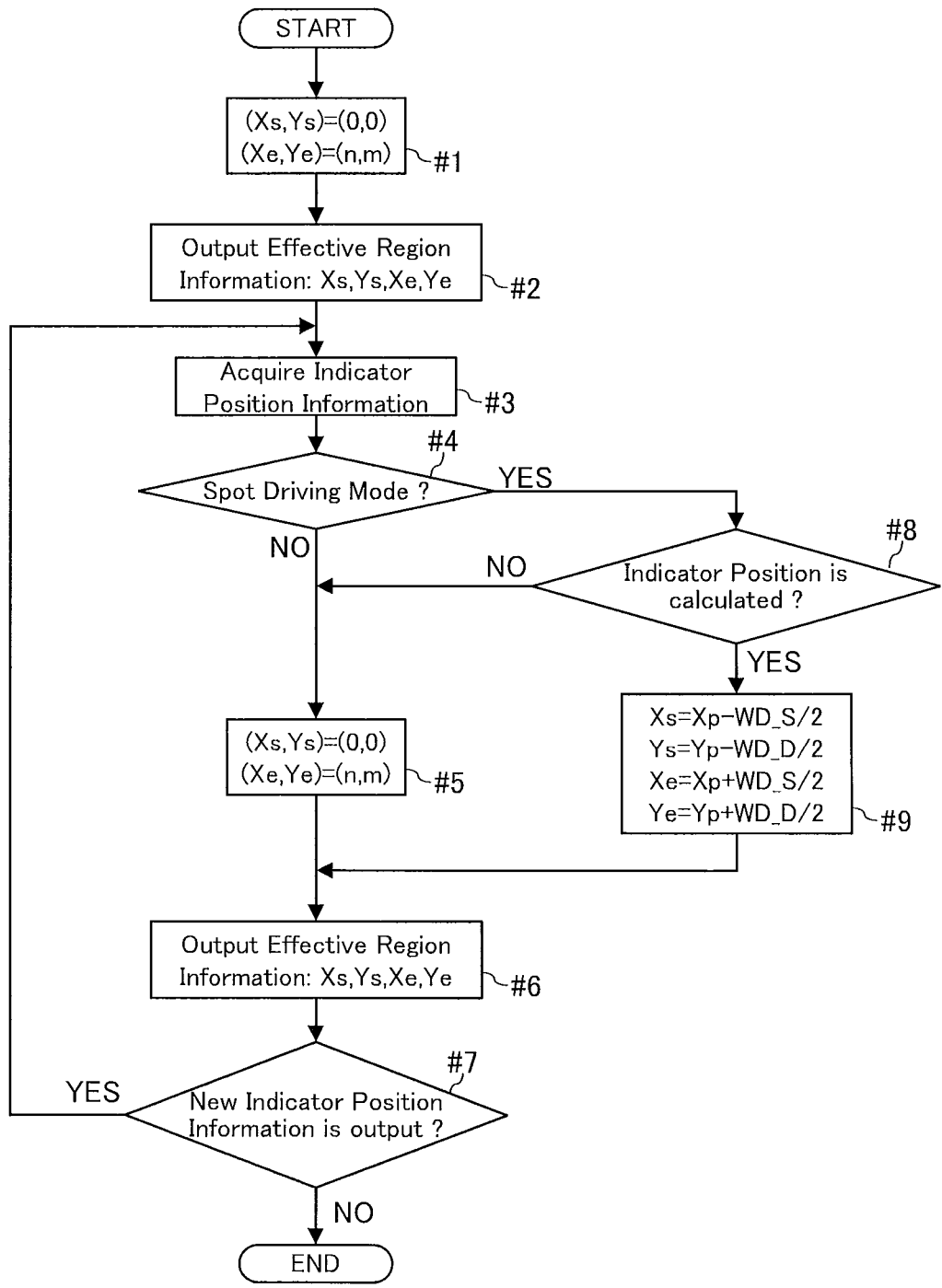
FIG. 6 is a flow chart showing an example of a specific operation of a region setting portion according to the first operation example.

An example of a specific serial operation of the region setting portion 4 will be described below with reference to the drawings. FIG. 6 is a flow chart showing an example of the specific operation of the region setting portion according to the first operation example. Moreover, FIG. 7 is a diagram showing an example of a method of setting an effective region according to the first operation example.

Figure 7:
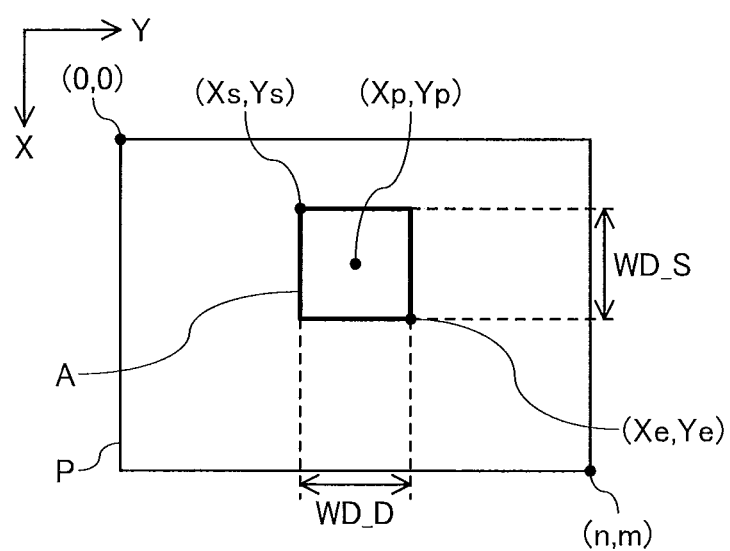
FIG. 7 is a diagram showing an example of a method of setting an effective region according to the first operation example.

For convenience of the description, as shown in FIG. 7, a position in an alignment direction of the sense line SL (a vertical direction in the drawing, an X direction) is represented by X and a position in an alignment direction of the drive line DL (a transverse direction in the drawing, a Y direction) is represented by Y, and a position in the detecting surface P is expressed in coordinates of (X, Y). Moreover, the coordinates of a left upper corner of the detecting surface P are set to be (0, 0) and coordinates of a right lower corner thereof are set to be (n, m). It is assumed that n and m are natural numbers, at least one of which is equal to or greater than two, and n sense lines SL and m drive lines DL are provided in the detecting surface P. Furthermore, coordinates of a left upper corner of the effective region A are set to be (Xs, Ys) and coordinates of a right lower corner of the effective region A are set to be (Xe, Ye).

Moreover, FIG. 7 illustrates the case in which the effective region A centered around a position (Xp, Yp) of the indicator has a length in the X direction set to be WD_S and a length in the Y direction set to be WD_D. The details of a method of setting the effective region A will be described below.

As shown in FIG. 6, the effective region calculating portion 41 calculates effective region information in which (Xs, Ys)= (0, 0) and (Xe, Ye)=(n, m) in order to set the whole detecting surface P as an effective region at a start of the operation of the touch panel system 1 (Step #1). Then, the effective region calculating portion 41 outputs the effective region information thus calculated (Step #2).

Next, the effective region calculating portion 41 acquires the indicator position information generated by the position calculating portion 3 (Step #3). At this time, the effective region calculating portion 41 confirms the parameter stored in the register 421 of the storing portion 42, thereby ascertaining whether there is employed a "spot driving mode" (a first mode) for setting a new effective region based on the position of the indicator or a "whole surface detecting mode" (a second mode) for continuously setting the whole detecting surface P as a new effective region (Step #4).

The "spot driving mode" and the "whole surface detecting mode" can be changed over according to an instruction (operation) of a user, for example. For this reason, the user can operate the touch panel system 1 in either the "spot driving mode" for enhancing power saving and a detection sensitivity or the "whole surface detecting mode" for detecting the indicator without omission from the whole detecting surface P depending on an installation environment, a usage environment or the like of the touch panel system, for example. The touch panel system 1 may have such a structure as to automatically select these modes and to carry out an operation depending on a main cause other than the instruction of the user.

In the case of the "whole surface detecting mode" (Step #4, NO), the effective region calculating portion 41 calculates effective region information in which (Xs, Ys)=(0, 0) and (Xe, Ye)=(n, m) in order to set the whole detecting surface P as a new effective region (Step #5). Then, the effective region calculating portion 41 outputs the effective region information thus calculated (Step #6).

If new indicator position information is output (Step #7, YES), thereafter, the processing returns to the Step #3 in which the indicator position information is acquired. On the other hand, if the new indicator position information is not output (Step #7, NO), the operation is ended.

If the "spot driving mode" is taken (Step #4, YES) and the position of the indicator on the detecting surface P is not calculated (Step #8, NO), the effective region calculating portion 41 carries out the same operation as that in the case of the "whole surface detecting mode" (Steps #5 to #7). Consequently, the whole detecting surface P is set as the effective region. Even if the indicator subsequently appears in any position on the detecting surface P, therefore, the status detecting portion 2 and the position calculating portion 3 can detect the indicator to calculate the position.

On the other hand, if the "spot driving mode" is employed (Step #4, YES) and the position of the indicator on the detecting surface P is calculated (Step #8, YES), the effective region calculating portion 41 calculates new effective region information in which Xs=Xp−WD_S/2, Ys=Yp−WD_D/2, Xe=Xp+WD_S/2 and Ye=Yp+WD_D/2 as shown FIG. 7 in order to set a new effective region including the position of the indicator (Step #9). Then, the effective region calculating portion 41 outputs the effective region information thus calculated (Step #6). Consequently, the effective region calculating portion 41 can set a new effective region A having a high possibility of an inclusion of a position in which the indicator is to be detected subsequently.

If the new indicator position information is output (Step #7, YES), thereafter, the processing returns to the Step #3 in which the indicator position information is acquired. On the other hand, if the new indicator position information is not output (Step #7, NO), the operation is ended.

As described above, in the touch panel system 1 according to the present example, an effective region to be a region in which the indicator is to be detected is set restrictively in the detecting surface P based on the position of the indicator which is calculated. By avoiding a useless detection, therefore, it is possible to reduce a power consumption and to enhance a detection sensitivity of the indicator.

The operations of the status detecting portion 2 and the position calculating portion 3 and the operation of the region setting portion 4 (the operations of the Steps #3 to #9 in FIG. 6) are repetitively carried out at a predetermined frame rate (for example, 120 Hz).

Although the effective region calculating portion 41 successively confirms, in the operation, whether the "spot driving mode" or the "whole surface detecting mode" is employed (Step #4), moreover, the confirmation does not need to be successively carried out. For example, operations depending on the respective modes may be carried out until the effective region calculating portion 41 performs the confirmation after the Step #2 and some instruction is then input from a user or the like.

A size of the effective region to be set by the region setting portion 4 (for example, WD_D and WD_S) may have a fixed value or a variable value. In the case in which the size of the effective region is set to have the variable value, if the region setting portion 4 sets a new effective region having a size corresponding to a moving speed of the indicator, there can be increased a possibility of an inclusion of a position in which the indicator is to be detected subsequently in a new effective region. Therefore, this is preferable.

Figure 8:
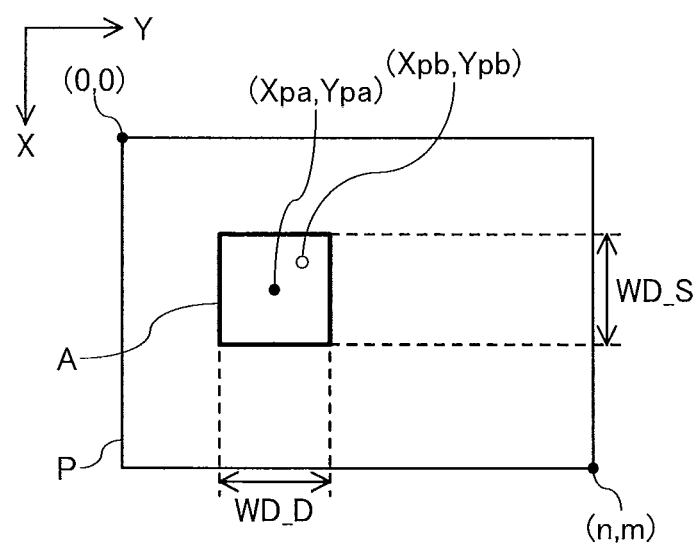
FIG. 8 is a diagram showing another example of the method of setting an effective region according to the first operation example.

An example of a specific method of setting an effective region in this case will be described with reference to FIG. 8. FIG. 8 is a diagram showing another example of the method of setting an effective region according to the first operation example. FIG. 8 illustrates the case in which a position of the indicator in a current frame is (Xpa, Ypa) and a position of the indicator in a next frame is (Xpb, Ypb). Moreover, a moving speed in the X direction of the indicator in the current frame is represented by Vx, a moving speed in the Y direction is represented by Vy and a frame rate is represented by f.

The region setting portion 4 sets a new effective region in such a manner that the position (Xpb, Ypb) of the indicator in the next frame is included based on the position (Xpa, Ypa) and the moving speed (Vx, Vy) of the indicator in the current frame. In other words, the region setting portion 4 sets a new effective region in order to obtain WD_S≥2×Vx/f and WD_D≥2×Vy/f. For example, if Vy=1000 mm/s and f=120 Hz are set, WD_D≥16.7 mm is obtained.

In the region setting portion 4, furthermore, a fluctuation amount of the position of the indicator may be obtained by storing the position of the indicator acquired sequentially in the storing portion 42 or the like, and the moving speed of the indicator in the current frame may be obtained based on the fluctuation amount.

Furthermore, the region setting portion 4 does not always need to set an effective region centered around the position of the indicator, For example, in the case in which the indicator is detected in the vicinity of an edge of the detecting surface P, the region setting portion 4 may set an effective region in which the position of the indicator leans to the edge side. Moreover, the region setting portion 4 may set an effective region based on a moving direction of the indicator. For example, the region setting portion 4 may set an effective region in which the position of the indicator leans in an opposite direction to the moving direction of the indicator.

<<Second Operation Example of Touch Panel System>>

In the touch panel system 1 shown in FIG. 1, the status detecting portion 2 and the position calculating portion 3 calculate the position of the indicator based on the variation in the capacitance distribution in the detecting surface P. Even if a plurality of indicators is present on the detecting surface P, consequently, it is possible to detect the respective indicators separately (which is multi-touch compatible). Therefore, an operation example (a second operation example) of the touch panel system 1 corresponding to multi-touch will be described below.

Referring to the second operation example, the position calculating portion 3 can calculate the positions of the indicators and the region setting portion 4 can set an effective region based on the positions of the indicators. However, a basic operation thereof is common to the first operation example. For this reason, in the following description of the second operation example, detailed explanation of common portions to those in the first operation example will be omitted in proper consideration of the description of the first operation example.

Figure 9:
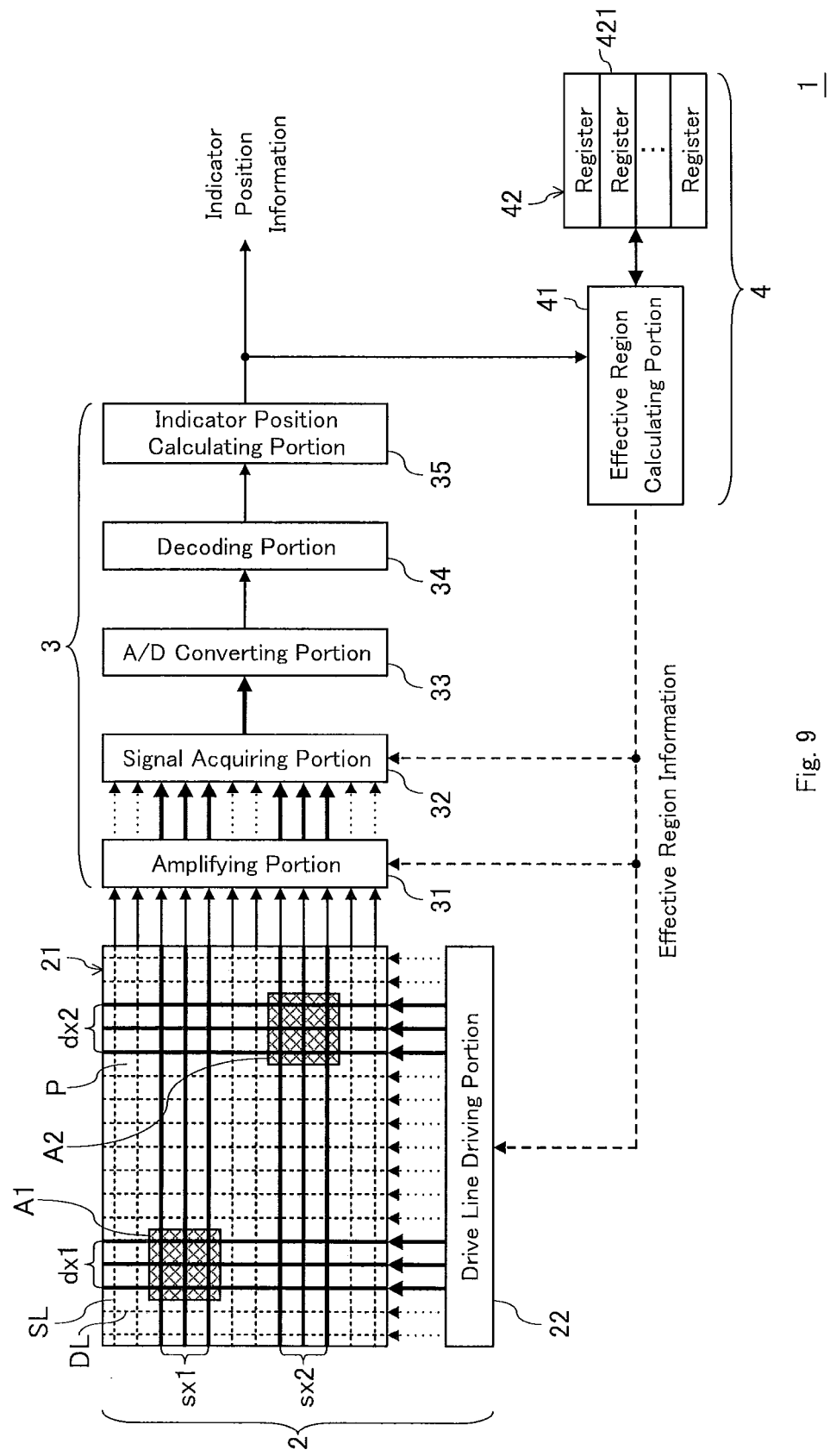
FIG. 9 is a block diagram showing an example of an effective region to be set in a detecting surface according to a second operation example.

First of all, an example of the effective region to be set in the detecting surface P by the region setting portion 4 will be described with reference to the drawings. FIG. 9 is a block diagram showing an example of an effective region to be set in a detecting surface according to the second operation example. FIG. 9 illustrates effective regions A1 and A2 to be set in the case in which two indicators are present in positions placed apart from each other on the detecting surface P.

Each of the effective regions A1 and A2 illustrated in FIG. 9 is set in a partial region of the detecting surface P. Moreover, each of a drive line dx1 and a sense line sx1 (thick solid lines in the drawing) passes through the effective region A1 and each of a drive line dx2 and a sense line sx2 (thick solid lines in the drawing) passes through the effective region A2. In other words, each of the detecting regions X constituted by the drive line dx1 and the sense line sx1 has at least a part included in the effective region A1, and each of the detecting regions X constituted by the drive line dx2 and the sense line sx2 has at least a part included in the effective region A2.

<Status Detecting Portion>

For concreteness of the description, there is assumed the case in which the effective regions A1 and A2 shown in FIG. 9 are set in the detecting surface P. In this case, the drive line driving portion 22 applies a driving signal to each of the drive line dx1 passing through the effective region A1 and the drive line dx2 passing through the effective region A2, respectively. On the other hand, the drive line driving portion 22 does not apply the driving signal to each of the drive lines which pass through neither of the effective regions A1 and A2.

Figure 10:
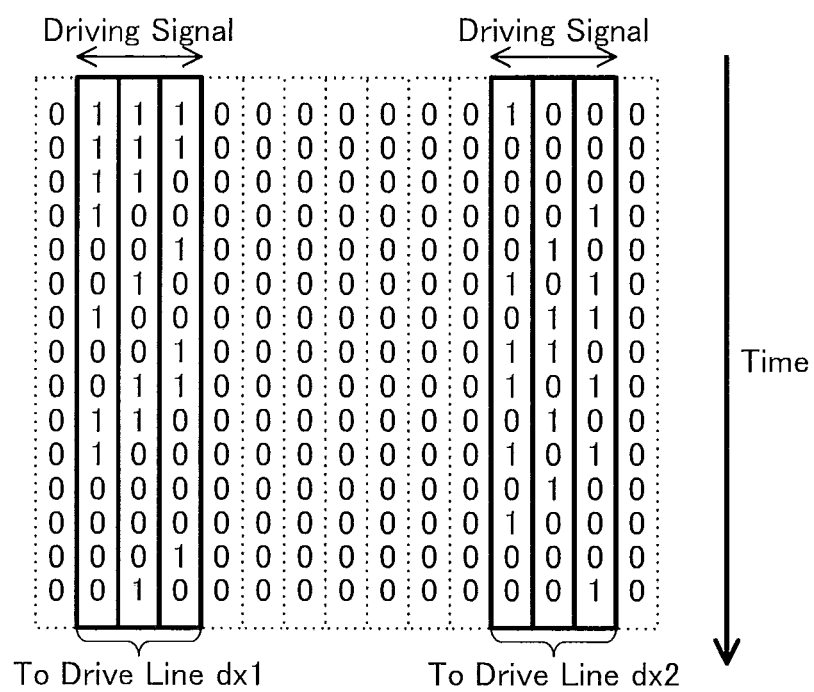
FIG. 10 is a diagram showing an example of a specific method of driving a drive line through a drive line driving portion according to the second operation example.

A specific example of a method of driving the drive line DL through the drive line driving portion 22 according to the second operation example will be described with reference to the drawings. FIG. 10 is a diagram showing an example of a specific method of driving a drive line through the drive line driving portion according to the second operation example.

As shown in FIG. 10, the drive line driving portion 22 applies the particular driving signal (see FIG. 3) to each of the drive line dx1 passing through the effective region A1 and the drive line dx2 passing through the effective region A2, respectively. Furthermore, the drive line driving portion 22 prevents a signal level of the drive line from being changed on a time basis by grounding each of the drive lines which pass through neither of the effective regions A1 and A2.

Also in the multi-touch, thus, when the drive line driving portion 22 selectively drives the drive lines dx1 and dx2 passing through the effective regions A1 and A2, respectively, the drive line DL can be prevented from being uselessly driven. Therefore, a power consumption taken for driving the drive line DL can be reduced, and furthermore, an occurrence of a noise can be suppressed, resulting in an enhancement in a detection sensitivity. By restrictively driving the drive lines dx1 and dx2, moreover, it is possible to enhance precision in the calculation of the position of the indicator in the position calculating portion 3.

<Position Calculating Portion>

Figure 11:
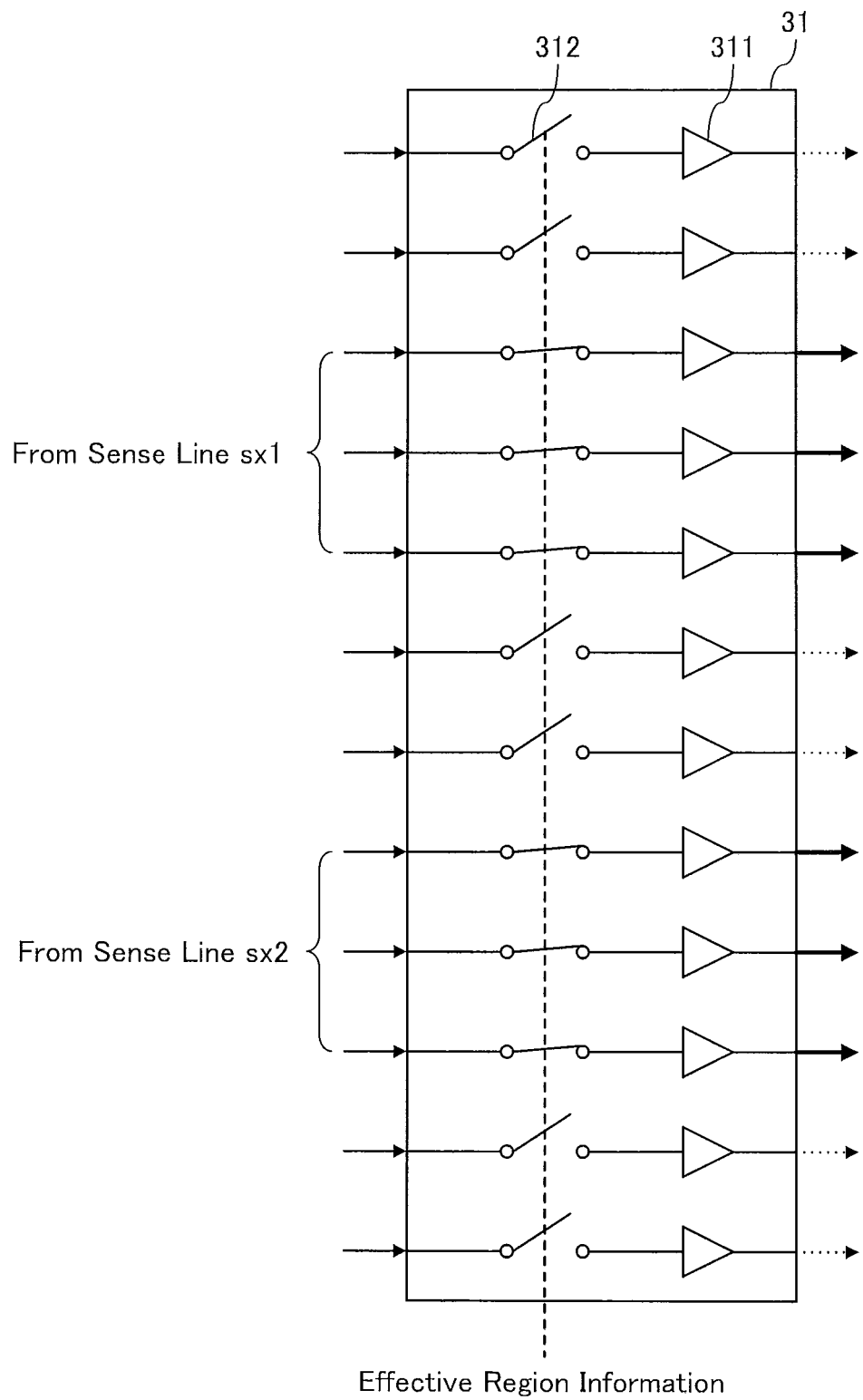
FIG. 11 is a block diagram showing an example of a specific operation of an amplifying portion according to the second operation example.

For concreteness of description, there is assumed the case in which the effective regions A1 and A2 shown in FIG. 9 are set in the detecting surface P. In this case, the amplifying portion 31 selectively amplifies status signals generated on the sense line sx1 passing through the effective region A1 and the sense line sx2 passing through the effective region A2 respectively. A specific operation example of the amplifying portion 31 will be described with reference to the drawings. FIG. 11 is a block diagram showing an example of the specific operation of the amplifying portion according to the second operation example. The amplifying portion 31 shown in FIG. 11 is the same as the amplifying portion 31 described in the first operation example (see FIG. 4).

As shown in FIG. 11, the opening/closing switch 312 to which each of the status signals generated on the sense line sx1 passing through the effective region A1 and the sense line sx2 passing through the effective region A2 is to be supplied is brought into a conduction status. Consequently, the status signals generated on the sense line sx1 passing through the effective region A1 and the sense line sx2 passing through the effective region A2 respectively are amplified by the amplifier 311 and are thus output from the amplifying portion 31. On the other hand, the opening/closing switch 312 to which the status signal generated on the sense line passing through neither of the effective regions A1 and A2 is to be supplied is brought into a non-conduction status. Consequently, the status signal generated on the sense line passing through neither of the effective regions A1 and A2 is not amplified by the amplifier 311 and is not output from the amplifying portion 31.

Thus, the amplifying portion 31 selectively amplifies the status signals generated on the sense lines sx1 and sx2 passing through the effective regions A1 and A2, respectively, so that a power consumption taken for amplifying the status signal can be reduced.

Figure 12:
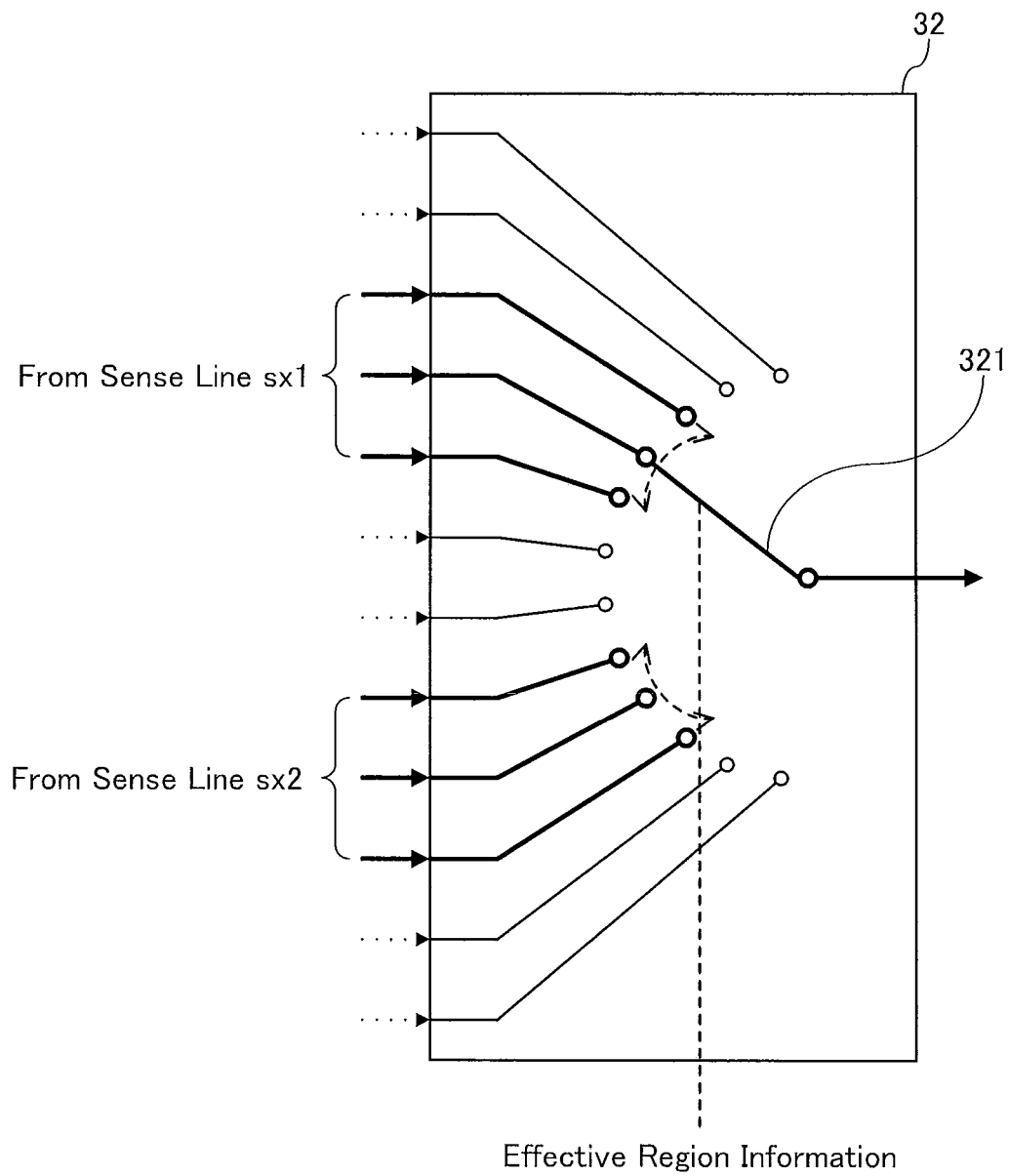
FIG. 12 is a block diagram showing an example of a specific operation of a selective acquiring portion according to the second operation example.

Moreover, the signal acquiring portion 32 selectively acquires the status signal generated on the sense line sx1 passing through the effective region A1 and the status signal generated on the sense line sx2 passing through the effective region A2 and outputs the status signals in a time division. A specific operation example of the signal acquiring portion 32 will be described with reference to the drawings. FIG. 12 is a block diagram showing an example of the specific operation of the selective acquiring portion according to the second operation example. The signal acquiring portion 32 shown in FIG. 12 is the same as the signal acquiring portion 32 described in the first operation example (see FIG. 5).

As shown in FIG. 12, the branch switch 321 can be connected to the terminals which correspond to the sense line sx1 passing through the effective region A1 and the sense line sx2 passing through the effective region A2 respectively. Consequently, the status signals generated on the sense line sx1 passing through the effective region A1 and the sense line sx2 passing through the effective region A2 respectively and amplified by the amplifying portion 31 are output to a subsequent stage. On the other hand, the branch switch 321 is not connected to the terminal corresponding to the sense line which passes through neither of the effective regions A1 and A2. Consequently, the status signal generated on the sense line which passes through neither of the effective regions A1 and A2 is not output to the subsequent stage.

Thus, the signal acquiring portion 32 selectively acquires the status signals generated on the sense lines sx1 and sx2 passing through the effective regions A1 and A2 respectively and then outputs them in a time division. Consequently, it is possible to prevent a useless status signal from being output to the subsequent stage of the signal acquiring portion 32. Therefore, it is possible to reduce a power consumption taken for a processing in the subsequent stage of the signal acquiring portion 32 (for example, the A/D converting portion 33, the decoding portion 34 and the indicator position calculating portion 35).

The A/D converting portion 33 converts an analog signal output by the signal acquiring portion 32 into a digital signal, the decoding portion 34 obtains a variation in a capacitance distribution in the detecting surface P (the effective regions A1 and A2) based on the digital signal, and the indicator position calculating portion 35 refers to the variation in the capacitance distribution, thereby calculating the position of the indicator on the detecting surface P (the effective regions A1 and A2) to generate indicator position information. At this time, the decoding portion 34 and the indicator position calculating portion 35 can calculate the position of the indicator for a region through which the drive line dx1 and the sense line sx2 pass and a region through which the drive line dx2 and the sense line sx1 pass in addition to the effective regions A1 and A2.

Also in the multi-touch, thus, the position calculating portion 3 selectively processes the status signals generated on the sense lines sx1 and sx2 passing through the effective regions A1 and A2, respectively, so that it is possible to prevent a useless processing for the status signals. Accordingly, it is possible to reduce the power consumption taken for the processing of the status signals. By restrictively processing the status signals generated on the sense lines sx1 and sx2 passing through the effective regions A1 and A2, respectively, moreover, it is possible to enhance precision in the calculation of the position of the indicator.

<Region Setting Portion>

Figure 13:
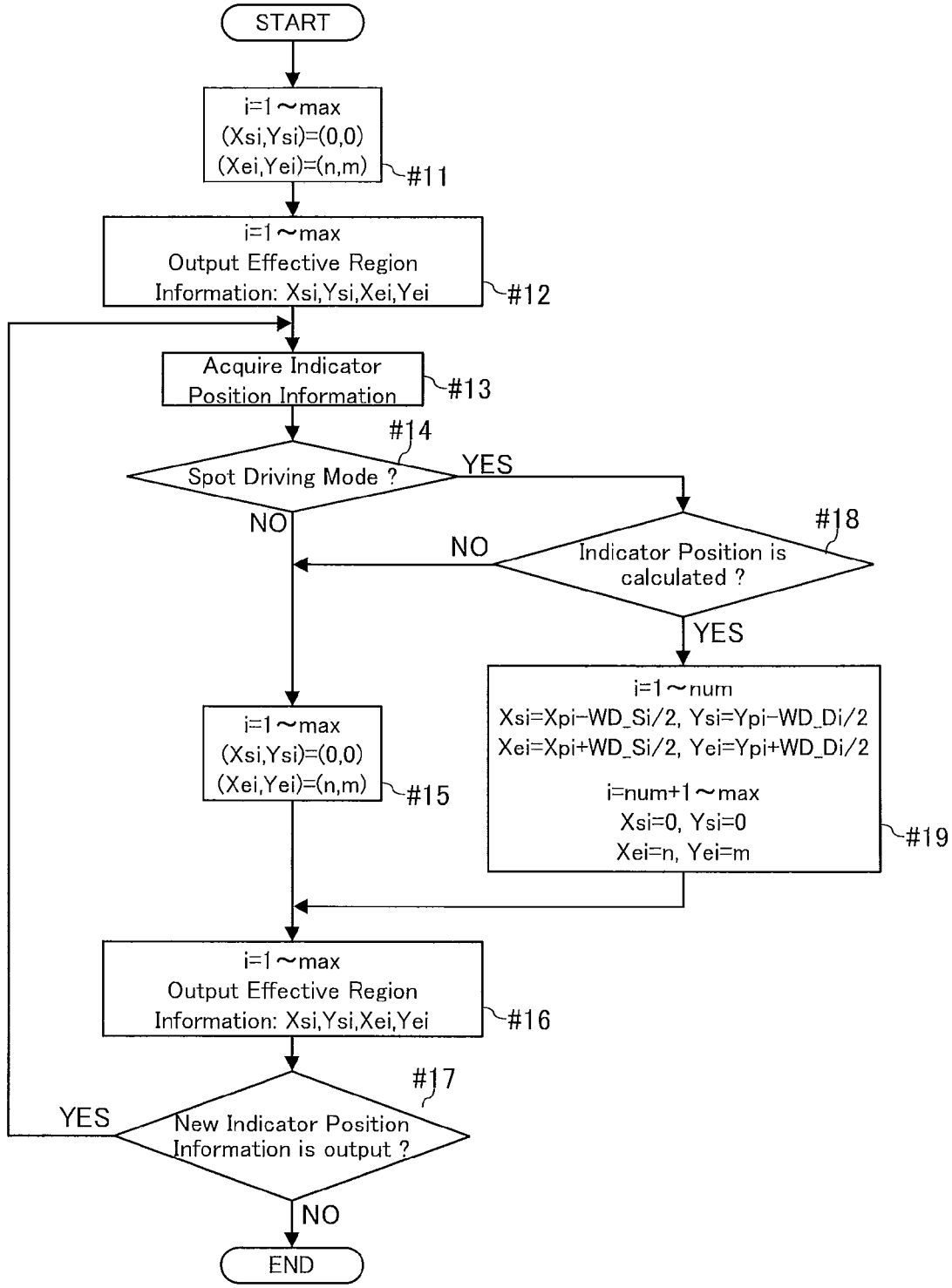
FIG. 13 is a flow chart showing an example of a specific operation of a region setting portion according to the second operation example.
Figure 14:
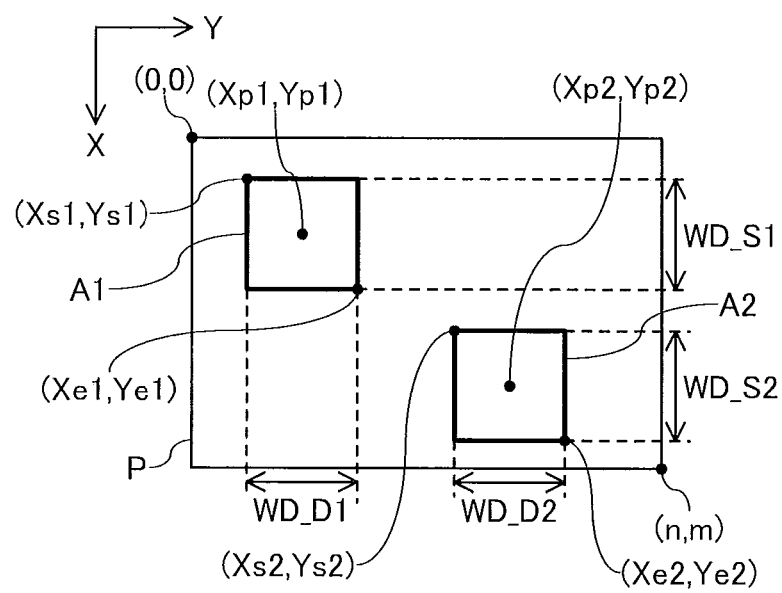
FIG. 14 is a diagram showing an example of a method of setting an effective region according to the second operation example.

Next, a specific serial operation example in which the region setting portion 4 sets (updates) an effective region will be described with reference to the drawings. FIG. 13 is a flow chart showing an example of the specific operation of the region setting portion according to the second operation example. Moreover, FIG. 14 is a diagram showing an example of a method of setting an effective region according to the second operation example. In the same manner as the description of the first operation example (see FIG. 7), a position in an alignment direction of the sense line SL (a vertical direction of FIG. 14, an X direction) is represented by X and a position in an alignment direction of the drive line DL (a transverse direction of FIG. 14, a Y direction) is represented by Y, and a position in the detecting surface P is expressed in coordinates of (X, Y) and furthermore, the coordinates of a left upper corner of the detecting surface P are set to be (0, 0) and coordinates of a right lower corner thereof are set to be (n, m). Moreover, coordinates of a left upper corner of the effective region Ai are set to be (Xsi, Ysi) and coordinates of a right lower corner of the effective region Ai are set to be (Xei, Yei).

The character i represents a number for identifying an effective region and effective region information and takes a value which is equal to or greater than one and is equal to or smaller than max (max is a natural number which is equal to or greater than two). In other words, max represents an upper limit of the number of the effective regions which can be set by the region setting portion 4, and may be the number which is equal to that of the positions of the indicators that can be calculated by the position calculating portion 3, for example. When the upper limit (max) is set to the number of the effective regions which can be set by the region setting portion 4, thus, it is possible to suppress an excessive increase in a calculation amount of the region setting portion 4 or an excessive increase in a total area of the effective regions set by the region setting portion 4, which is preferable.

FIG. 14 illustrates the case in which the effective region A1 centered around a position (Xp1, Yp1) of the indicator has a length in the X direction set to be WD_S1 and a length in the Y direction set to be WD_D1, and furthermore, the effective region A2 centered around a position (Xp2, Yp2) of the indicator has a length in the X direction set to be WD_S2 and a length in the Y direction set to be WD_D2. The details of a method of setting the effective regions A1 and A2 will be described below.

As shown in FIG. 13, the effective region calculating portion 41 calculates effective region information in which (Xs1, Ys1)=(0, 0) and (Xe1, Ye1)=(n, m) in order to set the whole detecting surface P as an effective region at a start of the operation of the touch panel system 1. At this time, the effective region calculating portion 41 may calculate effective region information about residual i=2 to max as an optional value. In the present example, however, it is assumed that the effective region information is calculated as (Xsi, Ysi)=(0, 0) and (Xei, Yei)=(n, m) in the same manner as the effective region information about i=1 (Step #11).

Next, the effective region calculating portion 41 outputs the effective region information about i=1 to max calculated at the Step #11 (Step #12). Although each of the status detecting portion 2 and the position calculating portion 3 drives the drive line DL or processes the status signal based on the effective region A1 corresponding to the effective region information about i=1, it disregards the effective region information about i=2 to max.

Next, the effective region calculating portion 41 acquires the indicator position information generated by the position calculating portion 3 (Step #13). At this time, the effective region calculating portion 41 confirms the parameter stored in the register 421 of the storing portion 42, thereby ascertaining whether there is employed a "spot driving mode" (a first mode) or a "whole surface detecting mode" (a second mode) (Step #14).

In the case of the "whole surface detecting mode" (Step #14, NO), the effective region calculating portion 41 calculates effective region information in which (Xs1, Ys1)=(0, 0) and (Xe1, Ye1)=(n, m) in order to set the whole detecting surface P as a new effective region. At this time, the effective region calculating portion 41 may calculate the effective region information about residual i=2 to max as an optional value. In the present example, however, it is assumed that the effective region information is calculated as (Xsi, Ysi)=(0, 0) and (Xei, Yei) (n, m) in the same manner as the effective region information about i=1 (Step #15).

Next, the effective region calculating portion 41 outputs the effective region information about i=1 to max calculated at the Step #15 (Step #16). Although each of the status detecting portion 2 and the position calculating portion 3 drives the drive line DL or processes the status signal based on the effective region A1 corresponding to the effective region information about i=1, it disregards the effective region information about i=2 to max.

If new indicator position information is output (Step #17, YES), thereafter, the processing returns to the Step #13 in which the indicator position information is acquired. On the other hand, if the new indicator position information is not output (Step #17, NO), the operation is ended.

If the "spot driving mode" is taken (Step #14, YES) and the position of the indicator on the detecting surface P is not calculated (Step #18, NO), the effective region calculating portion 41 carries out the same operation as that in the case of the "whole surface detecting mode" (Steps #15 to #17). Consequently, the whole detecting surface P is set as the effective region. Even if the indicator subsequently appears in any position on the detecting surface P, therefore, the status detecting portion 2 and the position calculating portion 3 can detect the indicator to calculate the position.

On the other hand, if the "spot driving mode" is employed (Step #14, YES) and the position of the indicator on the detecting surface P is calculated (Step #18, YES), the effective region calculating portion 41 calculates new effective region information about i=1 to num (num=2 in the example of FIG. 14) in which Xsi=Xpi−WD_Si/2, Ysi=Ypi−WD_Di/2, Xei=Xpi+WD_Si/2 and Yei=Ypi+WD_Di/2 as shown in FIG. 14, for example, in order to set a new effective region including the position of the indicator. In other words, num is the number of the effective regions to be set by the effective region calculating portion 4 and may be the number which is equal to that of the positions of the indicators which are calculated by the position calculating portion 3, for example. At this time, the effective region calculating portion 41 may calculate effective region information about residual i=num+1 to max as an optional value. In the present example, however, it is assumed that the effective region information is calculated as (Xsi, Ysi)=(0, 0) and (Xei, Yei)=(n, m) (Step #19).

Next, the effective region calculating portion 41 outputs the effective region information about i=1 to max calculated at the Step #19 (Step #16). Although each of the status detecting portion 2 and the position calculating portion 3 drives the drive line DL or processes the status signal based on effective regions A1 to Anum corresponding to the effective region information about i=1 to num respectively, it disregards the effective region information about i=num+1 to max. Consequently, the effective region calculating portion 41 can set the new effective regions A1 to Anum having a high possibility of an inclusion of a position in which the indicator is to be subsequently detected.

If the new indicator position information is output (Step #17, YES), thereafter, the processing returns to the Step #13 in which the indicator position information is acquired. On the other hand, if the new indicator position information is not output (Step #17, NO), the operation is ended.

As described above, in the touch panel system 1 according to the present example, the region setting portion 4 can set the effective region also in the case in which the position calculating portion 3 calculates the positions of the indicators (in the multi-touch). In the touch panel system 1 according to the present example, the effective regions to be regions in which the indicators are to be detected are set restrictively in the detecting surface P based on the positions of the respective indicators which are calculated. By avoiding a useless detection, therefore, it is possible to reduce a power consumption and to enhance a detection sensitivity of the indicator.

In the touch panel system 1 according to the present example, moreover, the effective regions corresponding to the positions of the respective indicators which are calculated are set respectively. Therefore, it is possible to provide a clearance (a region which is not the effective region) between the respective effective regions to be set by the region setting portion 4. For this reason, it is possible to reduce a total area of the effective regions to be set by the region setting portion 4.

The operations of the status detecting portion 2 and the position calculating portion 3 and the operation of the region setting portion 4 (the operations of the Steps #13 to #19 in FIG. 13) are repetitively carried out in a predetermined frame rate (for example, 120 Hz).

Although the effective region calculating portion 41 successively confirms, in the operation, whether the "spot driving mode" or the "whole surface detecting mode" is employed (Step #14), moreover, the confirmation does not need to be successively carried out. For example, operations depending on the respective modes may be carried out until the effective region calculating portion 41 performs the confirmation after the Step #12 and some instruction is then input from a user or the like.

Moreover, the effective region calculating portion 41 may set the whole detecting surface P as a new effective region in a predetermined timing (for example, every predetermined frame number) irrespective of whether the position of the indicator is calculated by the position calculating portion 3 in the "spot driving mode" or not. More specifically, it is decided whether a predetermined timing comes or not before the execution of the Step #18, and the Step #15 may be carried out if the predetermined timing comes and the Step #18 may be carried out if not so in FIG. 13, for example.

Consequently, the whole detecting surface P is set as the effective region in the predetermined timing even if a new indicator appears on the detecting surface P after the region setting portion 4 starts an operation for sequentially setting the effective region depending on the position of the indicator to be sequentially calculated by the position calculating portion 3 (spot driving). Therefore, the position calculating portion 3 can calculate the position of the new indicator.

Although a size of the effective region to be set by the region setting portion 4 (for example, WD_Si and WD_Si) may be equal, it may be made different every effective region (every i). Although the size of the effective region to be set by the region setting portion 4 (for example, WD_Di and WD_Si) may have a fixed value, moreover, it may have a variable value. In the case in which the size of the effective region is set to have the variable value, as described in the first operation example (see FIG. 8), if the region setting portion 4 can set a new effective region having a size corresponding to a moving speed of the indicator, there can be increased a possibility of an inclusion of a position in which the indicator is to be detected subsequently in the new effective region. Therefore, this is preferable.

Figure 15:
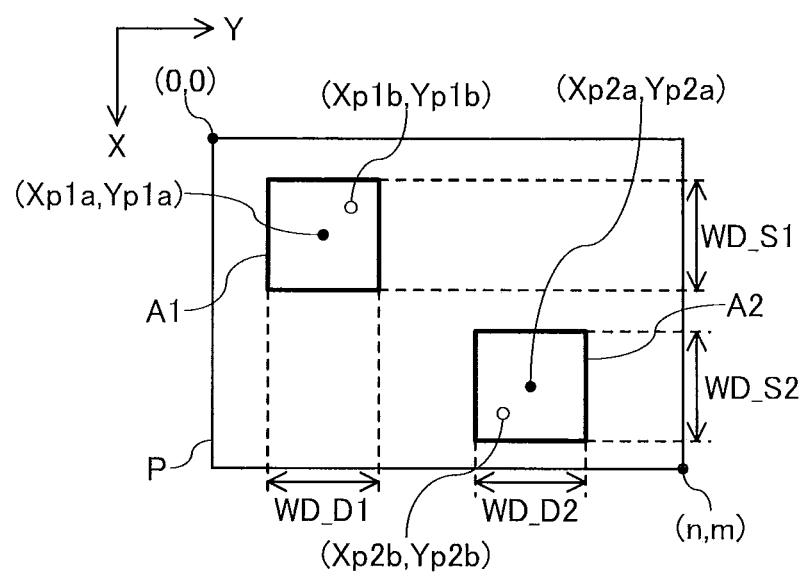
FIG. 15 is a diagram showing another example of the method of setting an effective region according to the second operation example.

An example of a specific method of setting an effective region in this case will be described with reference to FIG. 15. FIG. 15 is a diagram showing another example of the method of setting an effective region according to the second operation example. FIG. 15 illustrates the case in which a position of a first indicator in a current frame is $(Xp1a, Yp1a)$ and a position of a second indicator in the current frame is $(Xp2a, Yp2a)$, and the position of the first indicator in a next frame is $(Xp1b, Yp1b)$ and the position of the second indicator in the next frame is $(Xp2b, Yp2b)$. Moreover, a moving speed in the X direction of the first indicator in the current frame is represented by Vx1, a moving speed in the Y direction is represented by Vy1, a moving speed in the X direction of the second indicator in the current frame is represented by Vx2, a moving speed in the Y direction is represented by Vy2, and a frame rate is represented by f.

The region setting portion 4 sets a new effective region in such a manner that the position $(Xp1b, Yp1b)$ of the indicator in the next frame is included based on the position $(Xp1a, Yp1a)$ and the moving speed (Vx1, Vy1) of the first indicator in the current frame. In other words, the region setting portion 4 sets a new effective region so that it has $WD\_S1 \geq 2 \times Vx1/f$ and $WD\_D1 \geq 2 \times Vy1/f$. Similarly, the region setting portion 4 sets a new effective region in such a manner that the position $(Xp2b, Yp2b)$ of the indicator in the next frame is included based on the position $(Xp2a, Yp2a)$ and the moving speed (Vx2, Vy2) of the second indicator in the current frame. In other words, the region setting portion 4 sets a new effective region so that it has $WD\_S2 \geq 2 \times Vx2/f$ and $WD\_D2 \geq 2 \times Vy2/f$.

In the region setting portion 4, furthermore, fluctuation amounts of the positions of the respective indicators may be obtained by storing the positions of the respective indicators obtained sequentially in the storing portion 42, and the moving speeds of the respective indicators in the current frame may be obtained based on the fluctuation amounts.

Furthermore, the region setting portion 4 does not always need to set respective effective regions centered around the positions of the indicators. For example, in the case in which a certain indicator is detected in the vicinity of an edge of the detecting surface P, the region setting portion 4 may set an effective region in which the position of the certain indicator leans to the edge side. Moreover, the region setting portion 4 may set an effective region based on a moving direction of the indicator. For example, the region setting portion 4 may set an effective region in which the position of the certain indicator leans in an opposite direction to the moving direction of the certain indicator.

Figure 16:
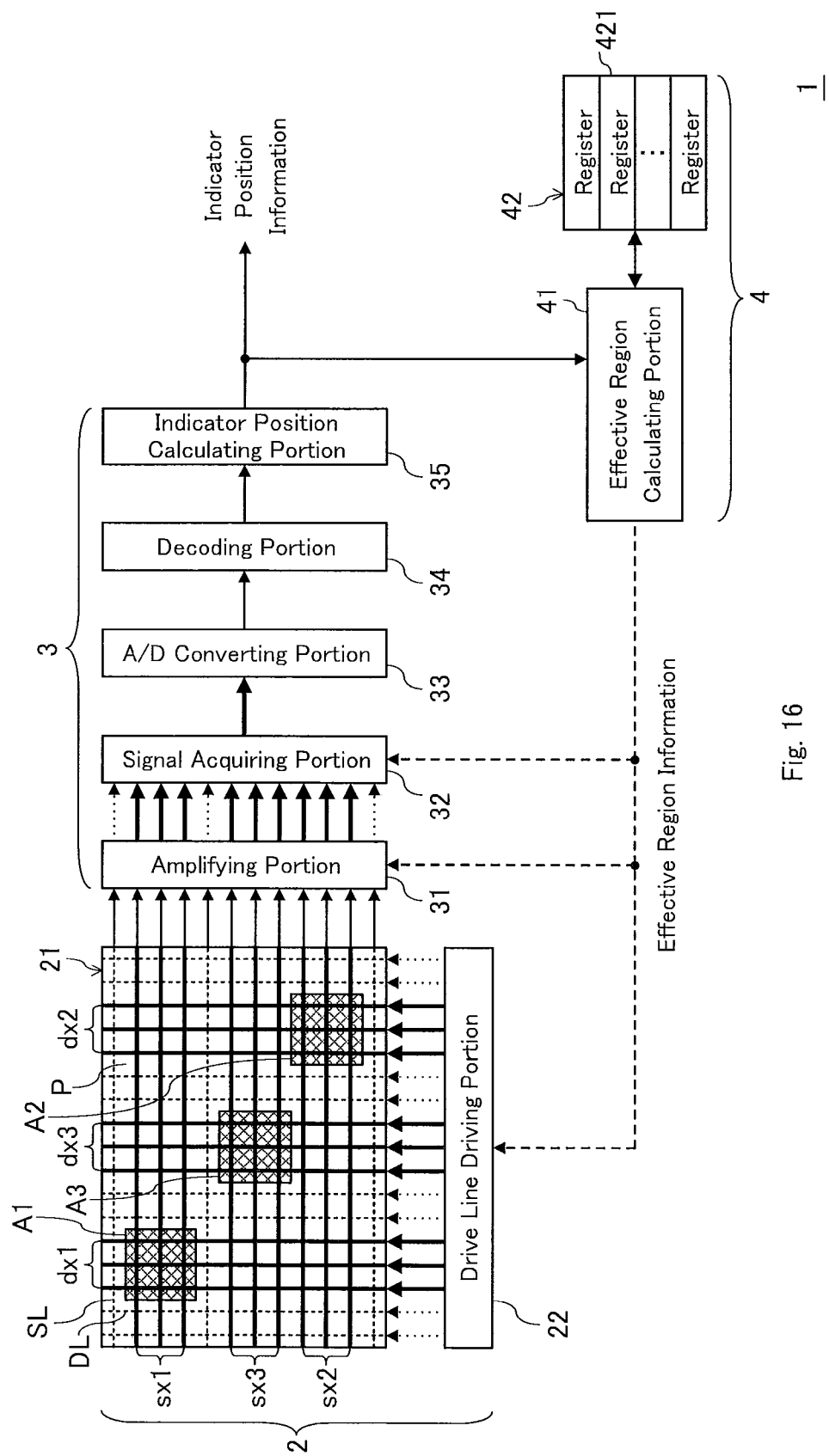
FIG. 16 is a block diagram showing another example of the effective region to be set in the detecting surface according to the second operation example.

In the description of the second operation example, moreover, there has been illustrated the case in which two indicators are mainly present apart from each other on the detecting surface P. Even if three indicators or more are present on the detecting surface P, however, the touch panel system 1 shown in FIG. 1 can be operated in the same manner. This will be described with reference to the drawings. FIG. 16 is a block diagram showing another example of the effective region to be set in the detecting surface in the second operation example. FIG. 16 illustrates the case in which three indicators are present apart from each other on the detecting surface P.

Even if the three indicators are present on the detecting surface P as shown in FIG. 16, the region setting portion 4 can set effective regions A1 to A3 corresponding to positions of the respective indicators (see FIG. 13). At this time, it is preferable that the drive line driving portion 22 should selectively drive a drive line dx1 passing through the effective region A1, a drive line dx2 passing through the effective region A2 and a drive line dx3 passing through the effective region A3 respectively. At this time, moreover, it is preferable that the position calculating portion 3 should selectively process the status signals generated on the sense line sx1 passing through the effective region A1, the sense line sx2 passing through the effective region A2 and the sense line sx3 passing through the effective region A3 respectively. The drive lines dx1 to dx3 and the sense lines sx1 to sx3 are displayed in thick solid lines of the drawing.

Even if the number of the indicators present on the detecting surface P fluctuates, thus, the drive line to be driven or the sense line to process the status signal only fluctuates depending on a change in the effective region set by the region setting portion 4. Accordingly, the touch panel system 1 shown in FIG. 1 can correspond to a multi-touch in which three indicators or more are present on the detecting surface P in the same manner as in the case in which two indicators are present (see FIGS. 9 to 15).

Figure 17:
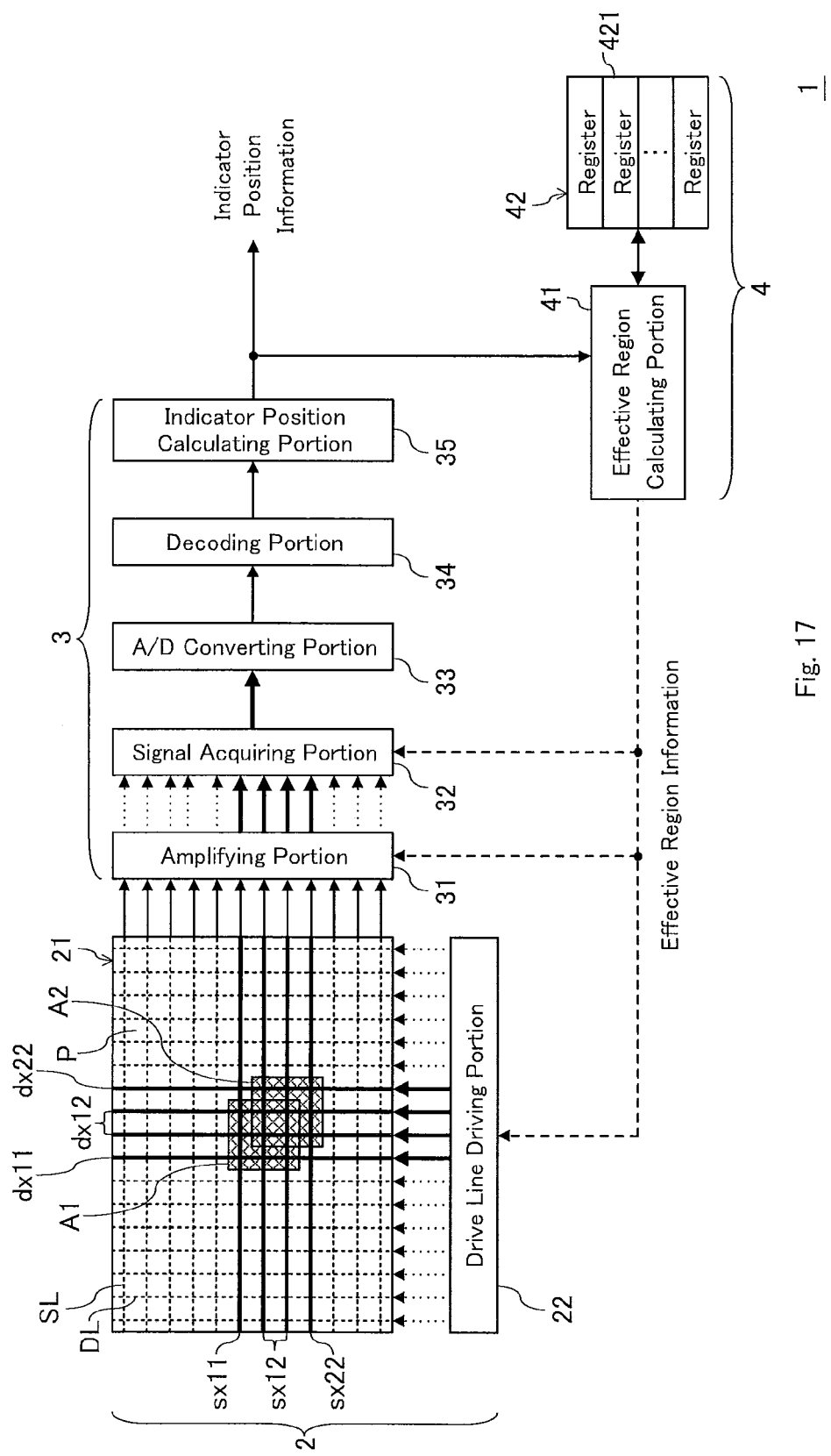
FIG. 17 is a block diagram showing a further example of the effective region to be set in the detecting surface according to the second operation example.

Although there has been illustrated the case in which the indicators are present apart from each other on the detecting surface P in the description of the second operation example, there might be the case in which the indicators are present close to each other on the detecting surface P. An operation example of the touch panel system 1 shown in FIG. 1 in this case will be described with reference to the drawing. FIG. 17 is a block diagram showing another example of the effective region to be set in the detecting surface according to the second operation example. FIG. 17 illustrates the case in which two indicators are present close to each other on the detecting surface P.

In the case in which the indicators are present close to each other on the detecting surface P as shown in FIG. 17, the region setting portion 4 can set the effective regions A1 and A2 having parts overlapping with each other. At this time, the drive line driving portion 22 selectively drives a drive line dx11 passing through only the effective region A1, a drive line dx22 passing through only the effective region A2, and a drive line dx12 passing through both of the effective regions A1 and A2, respectively. At this time, moreover, the position calculating portion 3 selectively processes status signals generated on a sense line sx11 passing through only the effective region A1, a sense line sx22 passing through only the effective region A2 and a sense line sx12 passing through both of the effective regions A1 and A2, respectively. The drive lines dx11, dx22 and dx12 and the sense lines sx11, sx22 and sx12 are displayed in thick solid lines of the drawing.

Figure 18:
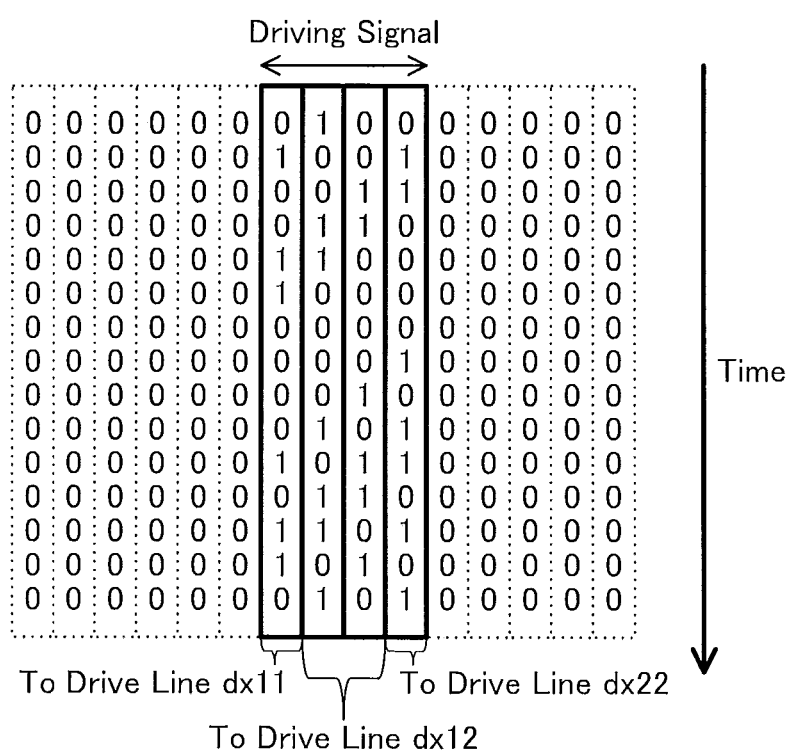
FIG. 18 is a diagram showing another example of the specific method of driving a drive line through the drive line driving portion according to the second operation example.

A specific example of a method of driving the drive line DL through the drive line driving portion 22 in this case will be described with reference to the drawings. FIG. 18 is a diagram showing another example of the specific method of driving the drive line through the drive line driving portion according to the second operation example. FIG. 18 shows an assumption of the case in which the effective regions A1 and A2 illustrated in FIG. 17 are set.

As shown in FIG. 18, the drive line driving portion 22 applies the particular driving signal (see FIG. 3) to each of the drive line dx11 passing through only the effective region A1, the drive line dx22 passing through only the effective region A2 and the drive line dx12 passing through both of the effective regions A1 and A2. Furthermore, the drive line driving portion 22 prevents a signal level of the drive line from being changed on a time basis by grounding each of the drive lines which pass through neither of the effective regions A1 and A2.

Figure 19:
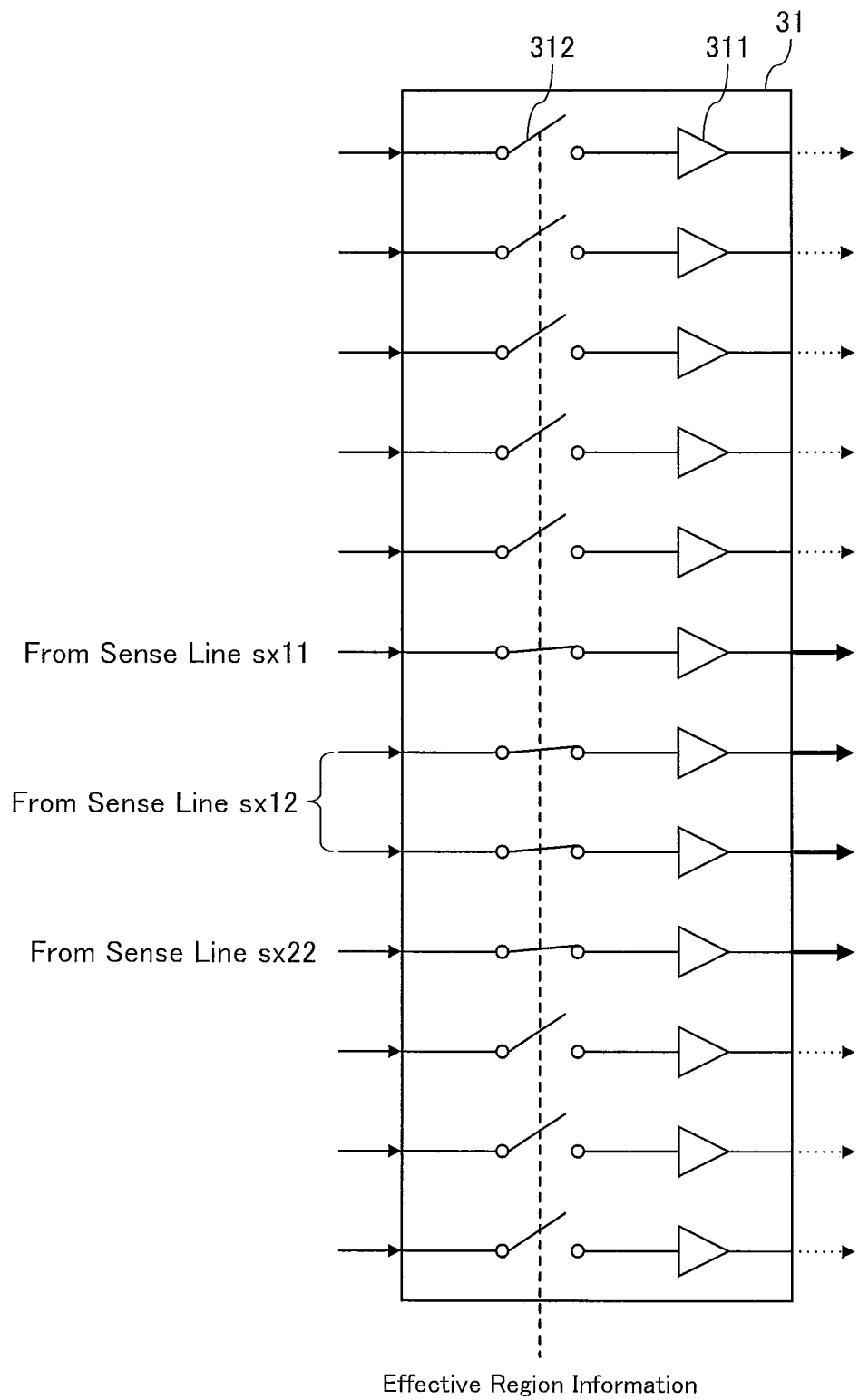
FIG. 19 is a block diagram showing another example of the specific operation of the amplifying portion according to the second operation example.

Moreover, a specific operation example of the amplifying portion 31 in this case will be described with reference to the drawing. FIG. 19 is a block diagram showing another example of the specific operation of the amplifying portion according to the second operation example. The amplifying portion 31 shown in FIG. 19 is the same as the amplifying portion 31 illustrated in FIG. 11. Furthermore, FIG. 19 shows an assumption of the case in which the effective regions A1 and A2 illustrated in FIG. 17 are set.

As shown in FIG. 19, the opening/closing switch 312 to which each of the status signals generated on the sense line sx11 passing through only the effective region A1, the sense line sx22 passing through only the effective region A2 and the sense line sx12 passing through both of the effective regions A1 and A2 is to be supplied is brought into a conduction status. Consequently, the status signals generated on the sense line sx11 passing through only the effective region A1, the sense line sx22 passing through only the effective region A2 and the sense line sx12 passing through both of the effective regions A1 and A2 respectively are amplified by the amplifier 311 and are thus output from the amplifying portion 31. On the other hand, the opening/closing switch 312 to which the status signal generated on the sense line passing through neither of the effective regions A1 and A2 is to be supplied is brought into a non-conduction status. Consequently, the status signal generated on the sense line not passing through the effective region A is not amplified by the amplifier 311 and is not output from the amplifying portion 31.

Figure 20:
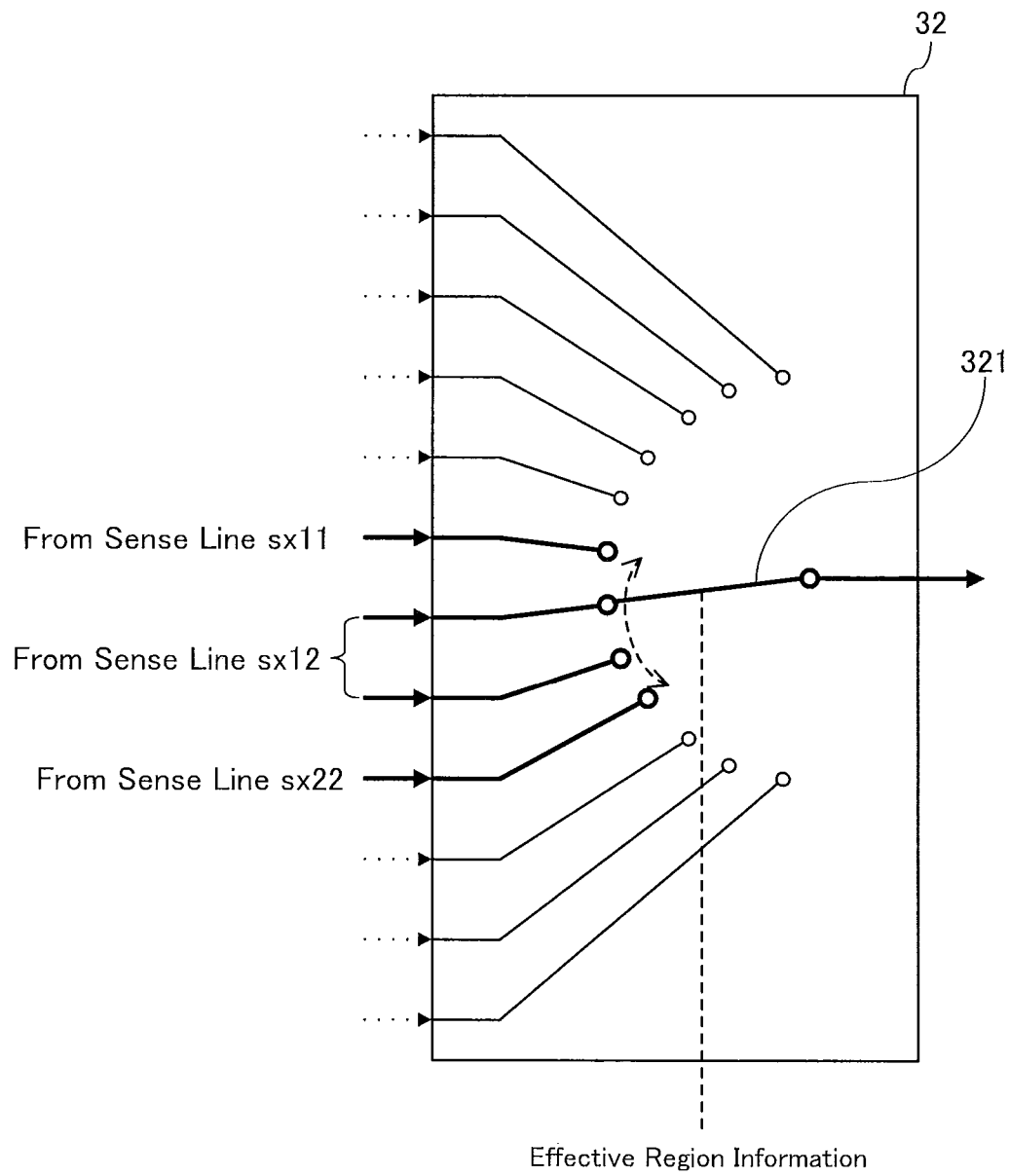
FIG. 20 is a block diagram showing another example of the specific operation of the selective acquiring portion according to the second operation example.

Moreover, a specific operation example of the signal acquiring portion 32 in this case will be described with reference to the drawing. FIG. 20 is a block diagram showing another example of the specific operation of the selection acquiring portion according to the second operation example. The signal acquiring portion 32 shown in FIG. 20 is the same as the signal acquiring portion 32 illustrated in FIG. 12. Furthermore, FIG. 20 shows an assumption of the case in which the effective regions A1 and A2 illustrated in FIG. 17 are set.

As shown in FIG. 20, the branch switch 321 can be connected to the terminals which correspond to the sense line sx11 passing through only the effective region A1, the sense line sx22 passing through only the effective region A2 and the sense line sx12 passing through both of the effective regions A1 and A2 respectively. Consequently, the status signals generated on the sense line sx11 passing through only the effective region A1, the sense line sx22 passing through only the effective region A2 and the sense line sx12 passing through both of the effective regions A1 and A2 respectively and amplified by the amplifying portion 31 are output to a subsequent stage. On the other hand, the branch switch 321 is not connected to the terminal corresponding to the sense line which passes through neither of the effective regions A1 and A2. Consequently, the status signal generated on the sense line which passes through neither of the effective regions A1 and A2 is not output to the subsequent stage.

Even if the indicators present on the detecting surface P are close to each other, thus, the drive line to be driven or the sense line to process the status signal only fluctuates depending on a change in the effective region set by the region setting portion 4. Accordingly, the touch panel system 1 shown in FIG. 1 can correspond to a multi-touch in the case in which the indicators present on the detecting surface P are close to each other in the same manner as in the case in which the indicators are present apart from each other (see FIGS. 9 to 15).

As described above, in a situation in which the indicators present on the detecting surface P are close to each other, the region setting portion 4 substantially sets the effective region including the positions of the respective indicators. The region setting portion 4 may calculate effective region information to set an effective region including the positions of the respective indicators in the case in which the indicators present on the detecting surface P are close to each other.

Irrespective of the close status of the indicators which are present on the detecting surface P, moreover, the region setting portion 4 may set the effective region based on the positions of the indicators which are calculated by the position calculating portion 3. More specifically, for example, the region setting portion 4 may set an effective region including the positions of the respective indicators which are calculated by the position calculating portion 3.

<<Variant and the Like>>

[1] Although there has been illustrated the structure in which both of the amplifying portion 31 and the signal acquiring portion 32 selectively process the status signal based on the effective region information, it is also possible to employ a structure in which one of them carries out a selective processing. Also in the case in which one of these processings is carried out, it is possible to reduce a power consumption.

[2] Although there has been illustrated the case in which the operation (first operation) for selectively generating the status signal by the status detecting portion 2 and the operation (second operation) for selectively processing the status signal by the position calculating portion 3 are carried out together, one of the operations may be performed. Also in the case in which one of these operations is carried out, it is possible to reduce a power consumption and to enhance a detection sensitivity.

[3] Although there has been illustrated the projected capacitive touch panel system as an embodiment according to the present invention, the present invention can also be applied to a touch panel system of any type which can selectively generate or process a status signal, for example, another projected capacitive type, a surface capacitive type, an optical type or the like.

INDUSTRIAL APPLICABILITY

A touch panel system and a method of operating the same according to the present invention can suitably be utilized in a large-sized touch panel system or the like, for example.

EXPLANATION OF REFERENCES

1: TOUCH PANEL SYSTEM
2: STATUS DETECTING PORTION
21: MOUNTING SURFACE
22: DRIVE LINE DRIVING PORTION
3: POSITION CALCULATING PORTION
31: AMPLIFYING PORTION
311: AMPLIFIER
312: OPENING/CLOSING SWITCH
32: SIGNAL ACQUIRING PORTION
321: BRANCH SWITCH
33: A/D CONVERTING PORTION
34: DECODING PORTION
35: INDICATOR POSITION CALCULATING PORTION
4: REGION SETTING PORTION
41: EFFECTIVE REGION CALCULATING PORTION
42: STORING PORTION
421: REGISTER
DL, dx, dx1 to dx3: DRIVE LINE
SL, sx, sx1 to sx3: SENSE LINE
P: DETECTING SURFACE
X: DETECTING REGION
A, A1 to A3: EFFECTIVE REGION

The invention claimed is:

1. A touch panel controller comprising:
a driving portion for driving a plurality of status signal generating portions at a predetermined frame rate each of which generates a status signal indicative of a close status of an indicator to an assigned detecting region;
a position calculating portion for processing the status signal output from each of the status signal generating portions, at the frame rate, thereby calculating a position of the indicator on a detecting surface constituted by a combination of detecting regions; and
a region setting portion for setting a first effective region including an estimated moving range of the indicator obtained by multiplying a moving speed of the indicator by a reciprocal of the frame rate based on the position of the indicator calculated by the position calculating portion, and setting a second effective region which is the whole detecting surface when the position calculating portion does not calculate the position of the indicator, wherein
when the region setting portion sets the first effective region, the touch panel controller carrying out at least one of:
a first operation for causing the driving portion to selectively drive the status signal generating portion in which at least a part of the assigned detecting region is included in the first effective region, thereby generating the status signal selectively; and
a second operation for causing the position calculating portion to selectively process the status signal generated by the status signal generating portion in which at least a part of the assigned detecting region is included in the first effective region.

2. The touch panel controller according to claim 1, wherein the status signal generating portions are constituted by:
a plurality of parallel drive lines provided along the detecting surface; and
a plurality of parallel sense lines provided along the detecting surface, the sense lines solid crossing the drive lines, each of the sense lines generating the status signal, and
the driving portion drives the drive line, thereby generating the status signal on the sense line solid crossing the driven drive line.

3. The touch panel controller according to claim 2, wherein when the region setting portion sets the first effective region, the driving portion selectively drives the drive line passing through the first effective region.

4. The touch panel controller according to claim 3, wherein when the region setting portion sets the first effective region,
the driving portion applies a particular driving signal set every drive line to each of the drive lines passing through the first effective region, and
does not apply the driving signal to each of the drive lines not passing through the first effective region.

5. The touch panel controller according to claim 2, wherein when the region setting portion sets the first effective region,
the position calculating portion selectively processes the status signal generated on the sense line passing through the first effective region.

6. The touch panel controller according to claim 5, wherein when the region setting portion sets the first effective region,
the position calculating portion includes an amplifying portion for selectively amplifying the status signal generated on the sense line passing through the first effective region.

7. The touch panel controller according to claim 5, wherein when the region setting portion sets the first effective region,
the position calculating portion includes a signal acquiring portion for selectively acquiring the status signal generated on the sense line passing through the first effective region and outputting the status signal in a time division.

8. The touch panel controller according to claim 1, wherein the region setting portion sets the first effective region including the position of the indicator calculated by the position calculating portion.

9. The touch panel controller according to claim 1, wherein the region setting portion sets the first effective region based on the position of the indicator calculated by the position calculating portion when a first mode is selected, and
the region setting portion continuously sets the second effective region when a second mode is selected.

10. The touch panel controller according to claim 1, wherein the region setting portion sets the first effective region based on the positions of the indicators calculated by the position calculating portion when the position calculating portion calculates the positions of the indicators.

11. The touch panel controller according to claim 10, wherein the region setting portion sets a plurality of first effective regions corresponding to the positions of the respective indicators when setting the first effective regions based on the positions of the indicators calculated by the position calculating portion.

12. The touch panel controller according to claim 10, wherein an upper limit is set to the number of the first effective regions set by the region setting portion.

13. The touch panel controller according to claim 10, wherein the region setting portion sets the second effective region at every predetermined timing.

14. A touch panel system comprising:
the touch panel controller according to claim 1; and
the plurality of status signal generating portions.

15. The touch panel system according to claim 14, wherein the status signal generating portions are constituted by:
a plurality of parallel drive lines provided along the detecting surface; and
a plurality of parallel sense lines provided along the detecting surface, the sense lines solid crossing the drive lines, each of the sense lines generating the status signal, and
includes a mounting surface obtained by wiring the drive lines and the sense lines to a panel body.

16. A method of operating a touch panel system, comprising:
a status detecting step of generating a status signal indicative of a close status of an indicator to a detecting region at a predetermined frame rate;
a position calculating step of processing the status signal at the frame rate, thereby calculating a position of the indicator on a detecting surface constituted by a combination of detecting regions; and
an effective region setting step of setting a first effective region including an estimated moving range of the indicator obtained by multiplying a moving speed of the indicator by a reciprocal of the frame rate based on the position of the indicator calculated at the position calculating step, and setting a second effective region which is the whole detecting surface when the position of the indicator is not calculated at the position calculating step, wherein
when the first effective region is set in the effective region setting step, there is carried out at least one of:
a first operation for selectively generating the status signal indicative of the close status of the indicator to the detecting region having at least a part included in the first effective region at the status detecting step; and
a second operation for selectively processing the status signal indicative of the close status of the indicator to the detecting region having at least a part included in the first effective region at the position calculating step.

* * * * *